United States Patent

[11] 3,593,138

[72] Inventors James G. Dunn
Montclair;
Irving A. Krause, Nutley; Irving Lane Fletcher, East Rutherford, N.J.; Walter K. Allen, Silver Spring; John E. Miller, Wheaton, Md.

[21] Appl. No. 749,121
[22] Filed July 31, 1968
[45] Patented July 13, 1971
[73] Assignee The United States of America as represented by the Administrator of the National Aeronautics and Space Administration

[54] SATELLITE INTERLACE SYNCHRONIZATION SYSTEM
14 Claims, 20 Drawing Figs.

[52] U.S. Cl. 325/4, 325/39, 325/58, 343/5 DP, 343/7.5, 343/179
[51] Int. Cl. H04b 7/20
[50] Field of Search 343/5 DP, 7, 7.5, 100, 100 SAT, 179; 325/4, 15, 15 SAT, 58, 38, 39; 179/15 A; 178/69.5 X

[56] References Cited

UNITED STATES PATENTS

| | | | |
|---|---|---|---|
| 3,320,611 | 5/1967 | Sekimoto et al. | 343/7.5 |
| 3,351,858 | 11/1967 | Jowett et al. | 325/15 |
| 3,363,180 | 1/1968 | Geissler | 325/4 |
| 3,418,579 | 12/1969 | Hultberg | 325/58 |
| 3,430,237 | 2/1969 | Allen | 343/5 X |

*Primary Examiner*—Benedict V. Safourek
*Attorneys*—G. T. McCoy and R. F. Kompf

ABSTRACT: A master station and a plurality of slave stations include synchronization equipment to enable each of the stations to have access to a common repeater in a different time slot of a time division multiplex format at the repeater, there being motion between the stations and the repeater. The master station propagates a sync burst through the repeater. Each of the stations receives this sync burst from the repeater and adjusts the frequency of the timing signals therein to compensate for the doppler shift experienced in the propagation path from each of the stations to the repeater so that the desired frequency of the timing signals is present in the repeater. Each of the slave stations also propagates different low power level, psuedo noise code ranging signal through the repeater back to itself which is used to adjust the phase of the timing signals digitally and in an analog manner by means of a motor-driven phase shifter to account for the changing range between the repeater and each of the slave stations so that a data burst of each of the slave stations appears in the proper time slot of the time division multiplex format at the repeater.

INVENTORS
JAMES DUNN, IRVING A. KRAUSE,
IRVING L. FLETCHER, WALTER K. ALLEN,
BY JOHN E. MILLER.
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE, IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLECTCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT INVENTORS
JAMES DUNN, IRVING A. KRAUSE,
IRVING L. FLETCHER, WALTER K. ALLEN,
BY JOHN E. MILLER
Alfred C. Hill
AGENT

SATELLITE INTERLACE SYNCHRONIZATION SYSTEM

BACKGROUND OF THE INVENTION

This invention relates to communication systems and more particularly to communications systems wherein a plurality of stations gain access to and communicate through a common propagation media, such as a common repeater.

Multiple access communication systems have been utilized for many years to achieve multiple access to long-distance telephone trunk systems. In addition, this multiple access technique is applicable to other communication systems including, but not necessarily restricted thereto, (1) supervisory control systems to enable supervision, from a fixed common repeater, or from a central station through the common repeater, of the activities of a plurality of mobile stations, (2) remote control systems to enable control, from a fixed common repeater, or from a central station through the common repeater, of various responsive devices contained in a plurality of mobile stations, (3) communication systems to establish, maintain and/or enable communication between a fixed common repeater, or a communication center coupled to the fixed common repeater, and a plurality of mobile stations, such as is necessary between an airport control tower and a plurality of airliners, and between a dispatcher communication center and a fleet of taxicabs, emergency vehicles and cargo carrying trucks, and (4) a communication satellite system to enable a plurality of fixed ground stations to utilize a common repeater carried by an orbiting satellite.

In providing the multiple access for the various systems above set forth, different techniques have been employed in the past. One such technique is the so called random access technique to enable a plurality of stations to have access to and communicate through a common repeater on an undefined basis, namely, a random basis. Another such technique to permit achieving of multiple access is in the employment of frequency division multiplex techniques wherein each of the plurality of stations employs a different carrier signal and wherein the common repeater has the bandwidth to handle all of the different frequency carriers and the intelligence carried thereon. Still another technique enabling multiple access to a common repeater has been by the employment of time division multiplex techniques wherein each of the plurality of stations are assigned to, or are capable of selecting, a time slot in time division multiplex frame or format at the common repeater to thereby permit communication through the common repeater in a noninterferring relationship.

In multiple access systems employing time division multiplex techniques it is mandatory that there be a strict time synchronization so that each of the plurality of stations transmits its intelligence in a different one of a plurality of time slots of a time division multiplex format and be so confined to that time slot selected for a particular station that its communication will not interfere with communications of other stations in adjacent time slots of the format.

The multiple access systems employing time division multiplex techniques have used both analog modulation, such as pulse amplitude modulation and pulse position modulation, and digital modulation, such as pulse code modulation. The general trend is toward pulse code modulation systems because of simplicity of radio equipment and efficiency of transmission in a power limited environment, such as may be encountered in satellite communication systems.

In time division multiplex multiple access systems, it has in the past been the practice for a common repeater to receive a number of independent carrier signals and by commutation equipment carried in the repeater interleave the independent carrier signals bit by bit in a continuous sequence. This arrangement requires considerable equipment in the repeater. If the repeater is mobile, such as in satellite communication systems and the like, there could result a weight problem for the vehicle carrying the repeater equipment and with respect to a satellite carrying the repeater equipment an increase in the cost of the launch vehicle to place the satellite in a desired orbit.

In a prior art time division multiplex multiple access system, such as described in U.S. Pat. No. 3,320,611 and Belgium Pat. No. 669,318, there is described an arrangement enabling a reduction in the hardware required in the repeater and, hence, a reduction in the problem of providing a vehicle to carry this repeater. By removing the time division multiplex equipment from the repeater itself it is possible to use a simple clipper/amplifier or hard limiting repeater.

It has been found, in addition, that the pulse or bit-by-bit interleaving imposes considerable equipment problems in the plurality of stations requiring access to the common repeater. This complexity can be overcome, or at least materially reduced where the interleaving at the repeater is performed on bursts of pulses from each station.

Where there is relative movement between the common repeater and the plurality of stations, whether it is the repeater that is moving, or the stations that are moving, or both the repeater and stations moving relative to each other, it is necessary, where time division multiplex techniques for multiple access to the common repeater are employed, to provide in some manner the range information between the station considered and the common repeater on a continuous basis. In the above-cited prior art patents, this range information was obtained from a computer or like device contained in each of the plurality of stations which provide information of the relative location of and range between the common station and the considered one of the plurality of stations with the programming of the computer being based upon predicted relative movement between the common repeater and the considered station. The total inaccuracy of the range prediction with elementary equipment has been determined to be in the order of one microsecond. Hence, the system timing format was developed having a one microsecond guard band between transmission from each station and the next adjacent station in the format. To realize reasonable efficiency of utilization of the common repeater, each station burst interval must be long in comparison to this guard band, hence, a burst length of 125 microseconds was established. Thus, each station must have equipment to store communication traffic for a short period of time and transmit this in a 125 microsecond burst. The repetition interval and, consequently, the required storage time is the product of burst length and the number of simultaneous users for which the multiple access system has been designed.

In a known prior art arrangement, the continuous range information is provided by means of a pseudo noise code signal transmitted from each of the stations through the repeater back to itself with the equipment responding to this pseudo noise code signal to adjust the timing signals to account for changing range between the station and the repeater with the control of the timing signals being performed in a digital manner.

SUMMARY OF THE INVENTION

An object of the present invention is to provide a time division multiplex multiple access system of the types described above employing time division multiplex techniques of an improved nature relative to the previously employed time division multiplex multiple access system.

Another object of the present invention is to provide a synchronizing system for a time division multiplex multiple access system wherein the synchronization equipment is located in each of a plurality of slave stations and a master station with the common repeater being of the hard limiter repeater.

Still another object of this invention is to provide a synchronizing system for a time division multiplex multiple access system that does not require knowing or predicting the position of the considered station and the common repeater and the range between the considered station and the common repeater.

A further object of this invention is to provide a synchronizing system for a time division multiplex multiple access system wherein the range information is continuously obtained by employing a pseudo noise code ranging signal.

Still a further object of this invention is to provide a combined digital and analog synchronizing system for a time division multiplex multiple access system incorporating therein an arrangement to compensate for the doppler shift of the transmission path from the considered station to the common repeater.

A feature of this invention is the provision of a synchronization system to control signals transmitted from each of a master station and a plurality of slave stations to be propagated through a common repeater in a different one of a plurality of time slots of time division multiplex format at the repeater, the stations and the repeater having relative motion therebetween, comprising first means disposed in the master station to transmit a sync burst through the repeater in one of the time slots; second means disposed in each of the slave stations responsive to the sync burst from the repeater to control the production of timing signals employed to control the time of transmission of the transmitted signals from the associated one of the slave stations; third means disposed in each of the slave stations to transmit a ranging signal through the repeater in its associated one of the time slots; and combined digital and analog means disposed in each of the slave stations coupled to the second means responsive to the ranging signal received from the repeater to adjust the phase of the timing signals so that the time of transmission of the transmitted signals from the associated one of the slave stations is such that the transmitted signals occur in the proper one of the time slots at the repeater.

Another feature of this invention is the provision of means in each of the above-mentioned first means and second means to adjust the frequency of the synch burst and the frequency of the transmitted signal to compensate for the doppler effect in the transmission path from the master station to the repeater and in the transmission path from the associated one of the slave stations to the repeater to provide the sync burst and the transmitted signal received at the repeater with the desired frequency.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Figures 1, 2, 3:
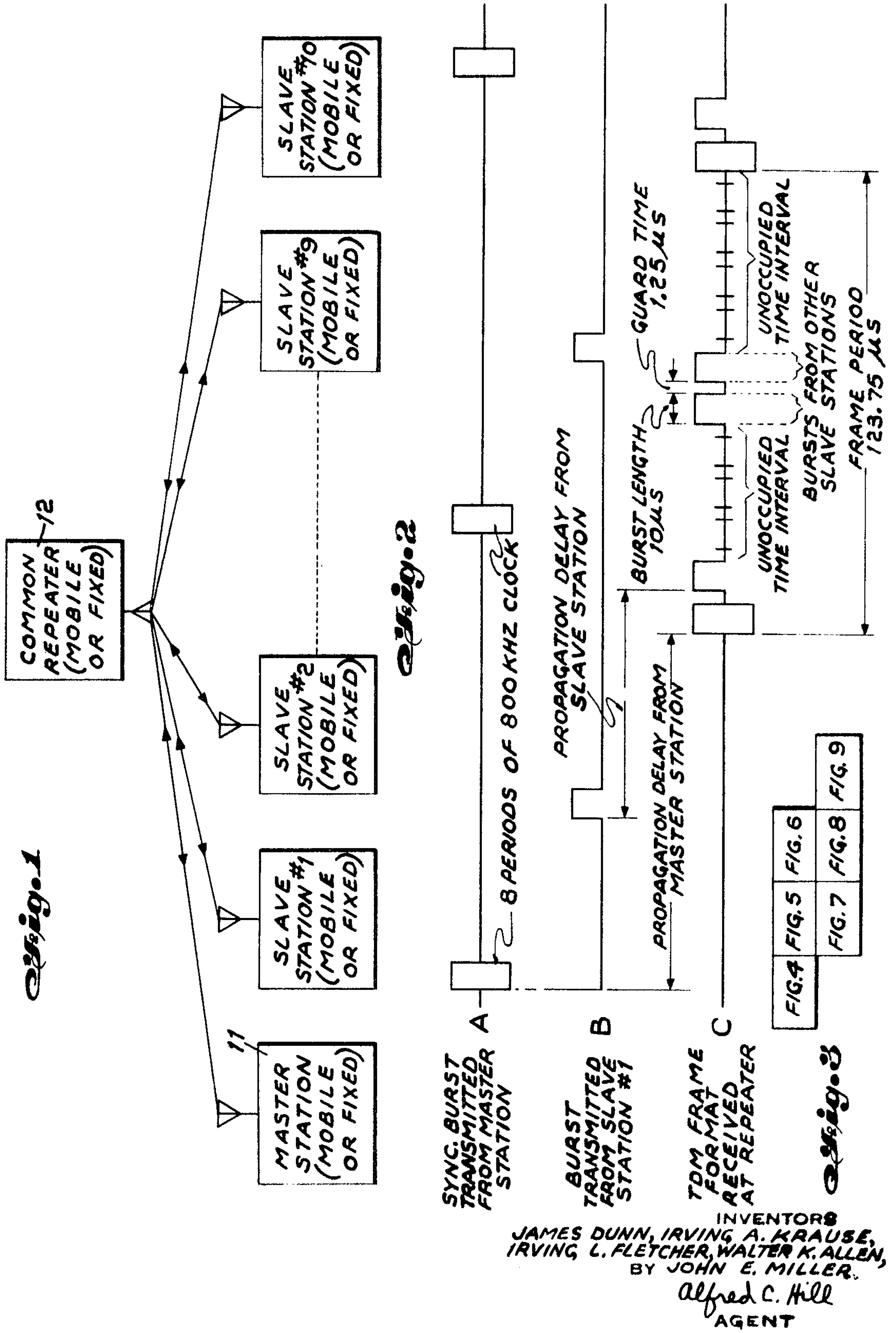
FIG. 1 is a block diagram illustrating the multiple access system in accordance with the principles of this invention.
FIG. 2 is a timing diagram illustrating the frame format of the time division multiplex frame at the common repeater of FIG. 1.
FIG. 3 illustrates the manner in which the sheets containing FIGS. 4, 5, 6, 7, 8, and 9 should be arranged.

Referring to FIG. 1, there is illustrated therein a block diagram of a generalized multiple access communication system wherein a plurality of stations, which for purposes of illustration and explanation are assumed to be master station 11 and slave stations 1 to 10, are shown in two-way communication with common repeater 12. As indicated, common repeater 12 can be fixed or mobile and each of stations 1 through 11 can be fixed or mobile. It should be noted that the multiple access system of FIG. 1 can be used in any of the applications outlined hereinabove under the heading "Background of the Invention." While this multiple access system can employ frequency division multiplex or random access techniques for multiple access, in accordance with the principles of this invention it is intended that multiple access be provided to repeater 12 by employing time division multiplex techniques.

In the multiple access communication system each of the stations 1 through 11 transmits bursts which are timed to arrive at the repeater 12 on a noninterferring relation relative to bursts from other stations. The phasing of the transmitted signals must then be adjusted to compensate for the difference in range between repeater 12 and the various stations 1 to 11. Where there is motion between repeater 12 and stations 1 and 11, the range is continuously changing and the continuous phase adjustment results in a frequency offset, namely, the doppler effect which is proportional to the rate of change of range.

The time division multiplex format for the system of this invention is shown in curve C, FIG. 2, and is based on the real time transmission of information. A single sync burst, as illustrated in Curve A, FIG. 2, is transmitted from the master station and 10 data bursts of 10 microseconds duration are transmitted from slave stations 1 through 10. Curve B, FIG. 2, illustrates the data bursts transmitted from slave station 1. As illustrated in Curve C, FIG. 2, the frame format at repeater 12 includes the sync burst and data bursts each having a 10 microsecond duration with a 1.25 microsecond guard time therebetween resulting in a frame period of 123.75 microseconds.

Synchronization is maintained by doppler tracking in which master station 11 tracks the doppler actively and slave stations 1 to 10 track the doppler passively. The sync burst carrier is modulated by 800 kHz. (kilohertz) which is harmonically related to the frame rate and is used for all time divisions in the format. Master station 11 transmits the sync burst consisting of 800 kHz. minus its own doppler and receives the sync burst as 800 kHz. plus its own doppler. The transmitted frequency is adjusted so that sum of the transmitted and received frequencies is a constant. This method of doppler tracking assures that the sync signal at the repeater 12 is true 800 kHz.

A slave station receives the pulsed sync burst from master station 11 via repeater 12. Since the signal was a true 800 kHz. at repeater 12, it will be received with the true doppler of the considered slave station. The slave station uses this signal to preset its transmit frame rate by a technique identical to that used by master station 11 for doppler tracking. The slave stations used in pseudo noise code ranging technique to determine the correct initial phase for their transmit format.

The equipment employed in each of the master station 11 and slave stations 1 through 10 is illustrated in block diagram form in FIGS. 4, 5, 6, 7, 8 and 9, when arranged as illustrated in FIG. 3. By proper manipulation of switches A4S59, A4S53, A4S56, A4S46, and A4S43 (FIG. 9), it is possible to have the equipment operate as a master station wherein the pseudo noise and subcarrier operation is inhibited and the sync burst and carrier operation are activated. To provide operation as a slave station, the sync burst modulation and carrier are inhibited and the pseudo noise modulation and subcarrier are activated.

In a master terminal, the master sync burst is generated in generator 13 and is used to phase modulate the carrier signal from oscillator 14 in phase modulator 15. The output of the phase modulator 15 is gated in gate 16 to form the sync burst. The gate control signal is generated in transmit timer 17 by dividing down the transmit clock provided by voltage-controlled oscillator 18 (FIG. 6) of the transmit clock phase-locked loop 19.

Figure 4:
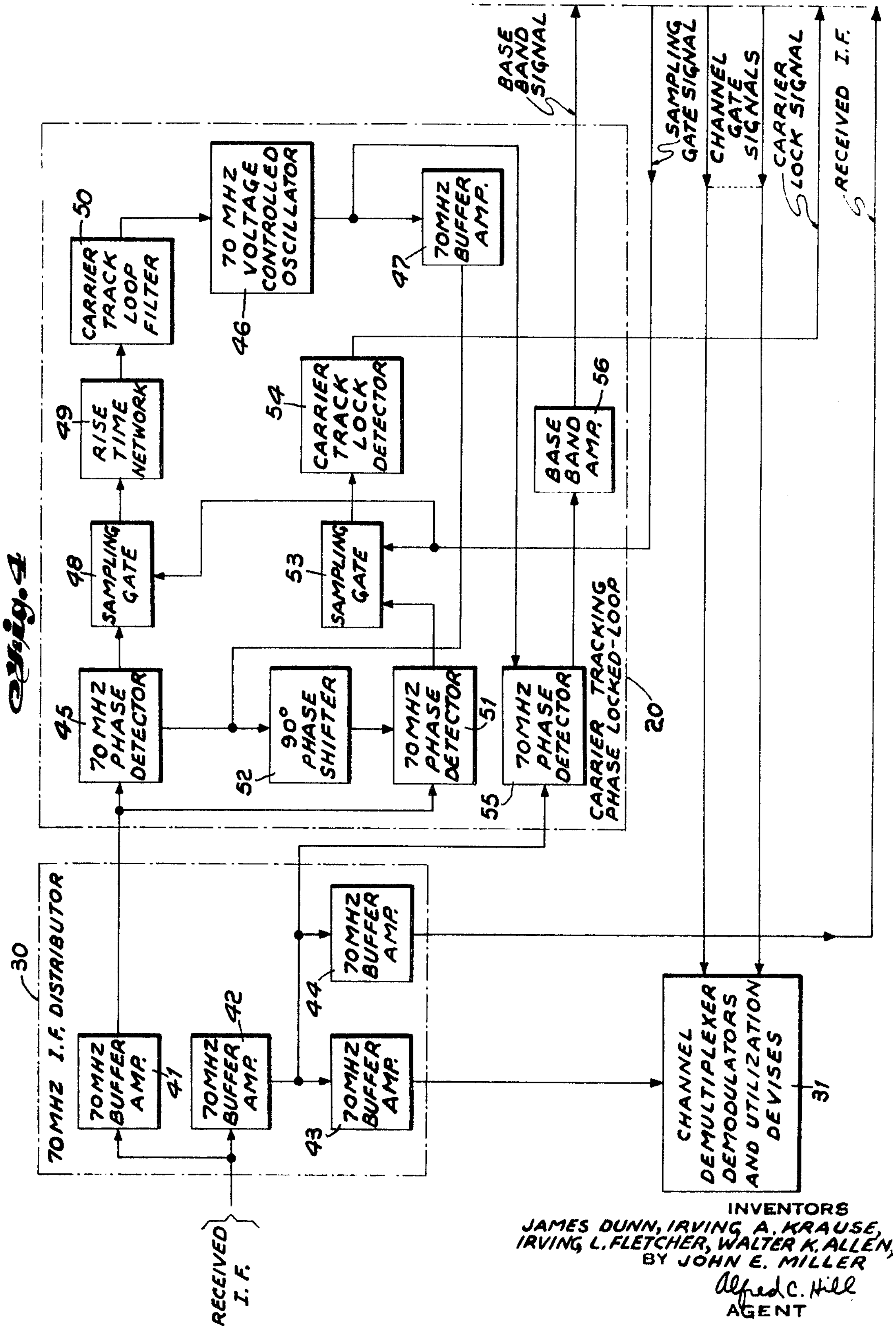
FIGS. 4, 5, 6, 7, 8 and 9, when arranged as illustrated in FIG. 3, is a block diagram of the equipment contained in each of the stations of FIG. 1 in accordance with the principles of this invention.

The received IF (intermediate frequency) signal is demodulated by the carrier tracking phase locked loop 20 (FIG. 4). The resulting 800 kHz. sync burst is used to lock the receive clock phase locked loop 21 (FIG. 5) thereby generating a continuous 800 kHz. clock which drives receive timer 22. Timer 22, in turn, generates the gating pulse for the carrier tracking phase lock loop 20 and the reference signals for the receive clock phase locked loop 21. Initially, neither of these loops is locked. To aid acquisition, the output of the carrier-tracking phase lock loop 20 drives the sync burst detector 23. This circuit which contains an 800 kHz. filter, envelope detector and threshold detector. This circuit will detect the time of occurrence of the sync burst even before carrier tracking phase locked loop 20 acquires. The occurrence of the sync burst resets the phase of receive timer 22 to within a fraction of a burst. This is sufficient for the carrier tracking phase locked loop 20 and receive clock phase locked 100p 21 to lock.

Receive clock phase lock loop 21 may lock in such a manner that receive timer 22 is an integral number of clock cycles out of correct phase. Receive clock phase locked loop 21 includes an error detector to measure relative timing between the received burst and the locally generated reference signal. If an error exists, receive timer 22 is stepped in the proper direction until it is operated in correct phase.

The transmit clock generator, identified as transmit clock phase locked loop 19, contains the doppler compensation circuit which adjusts the transmitted clock frequency to maintain the repeater clock frequencies at exactly 800 kHz. independent of first order doppler effects. This is implemented by passing the receive and transmit clock frequencies through a mixer arrangement which extracts their sum frequency, then compares the sum frequency with a 1600 kHz. reference frequency and adjusts the phase of the voltage controlled oscillator 18 in such a manner to keep the sum exactly equal to 1600 kHz.

Letting $fR$ and $fT$ denote the receive and transmit frequencies, respectively, this may be written as $fR+fT=1600$. Assuming that $fT$ is decreased by the doppler coefficient $d$ in transmission, the repeater frequency will be frep. $=fT-d$. Ignoring second order effects, the receive frequency will be equal to the repeater frequency reduced by $d$, namely, $fR =$ frep. $- d$. Substituting the last two equations into the first equation will demonstrate that the repeater frequency is 800 kHz.

Now let us consider briefly the operation of the equipment of FIG. 4, 5, 6, 7, 8 and 9 when operating as a slave terminal. The slave terminal has the same circuits used in the master terminal for receiving the master sync burst and generating the received clock and doppler compensated transmit clock. In the case of the slave terminal, however, this doppler compensation is an open loop operation. It cannot correct for differences between the 1600 kHz. reference frequency at the master and slave stations, or for second order frequency errors in the repeater clock frequency. In addition, the initial phase of the transmit timer must be adjusted according to the range of the repeater from the slave stations.

Figure 8:
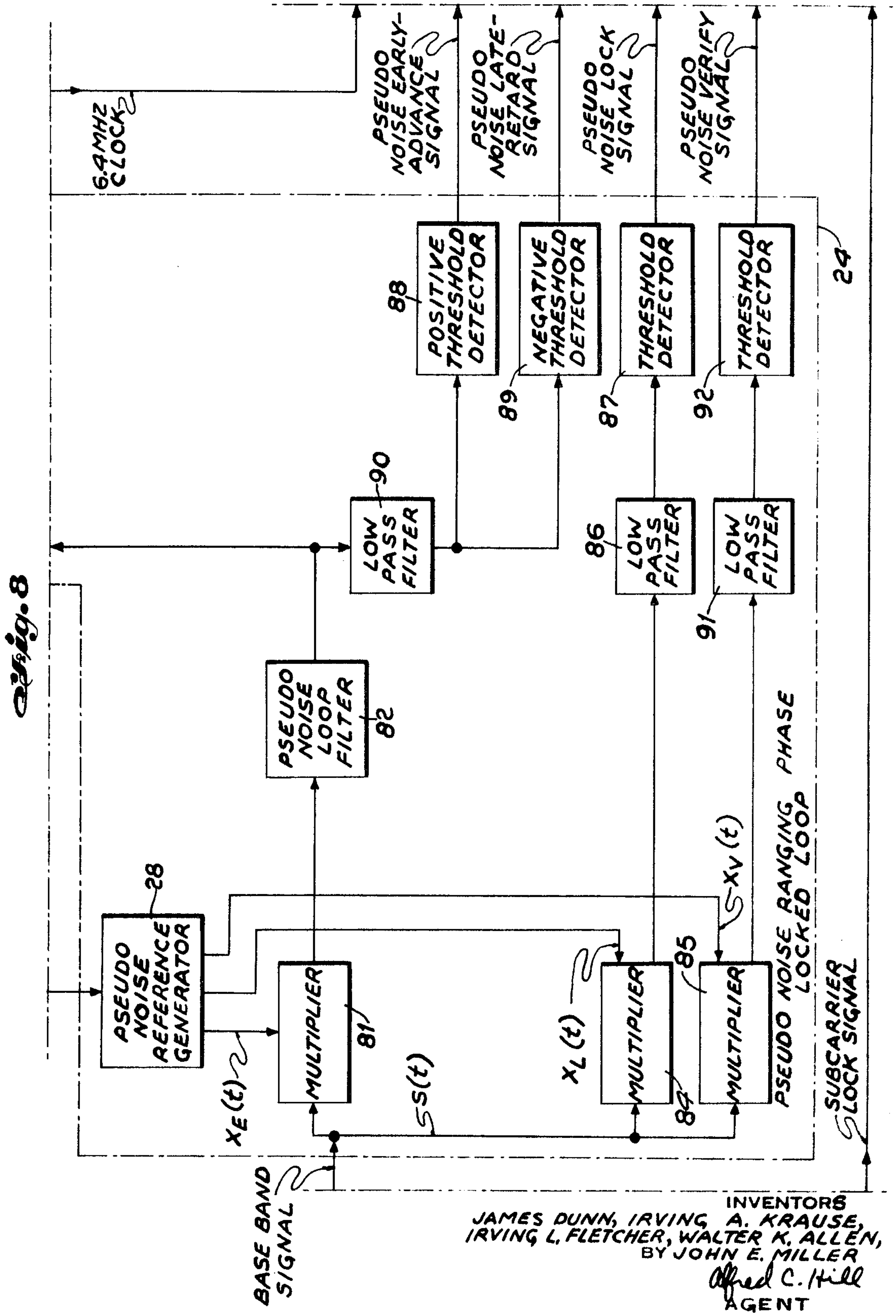

The open loop doppler compensation provided by transmit clock phase locked loop 19 (FIG. 6) is supplemented during acquisition by pseudo noise ranging phase locked loop 24 (FIG. 8). The slave terminal transmits a subcarrier signal derived from oscillator 25 (FIG. 9) which is phase modulated by the pseudo noise code in modulator 26. The subcarrier frequency is 2 MHz (MegaHertz) from the master carrier as produced by oscillator 14 and is at low power level level so as to cause no interference with the sync burst or any data bursts.

Figure 6:
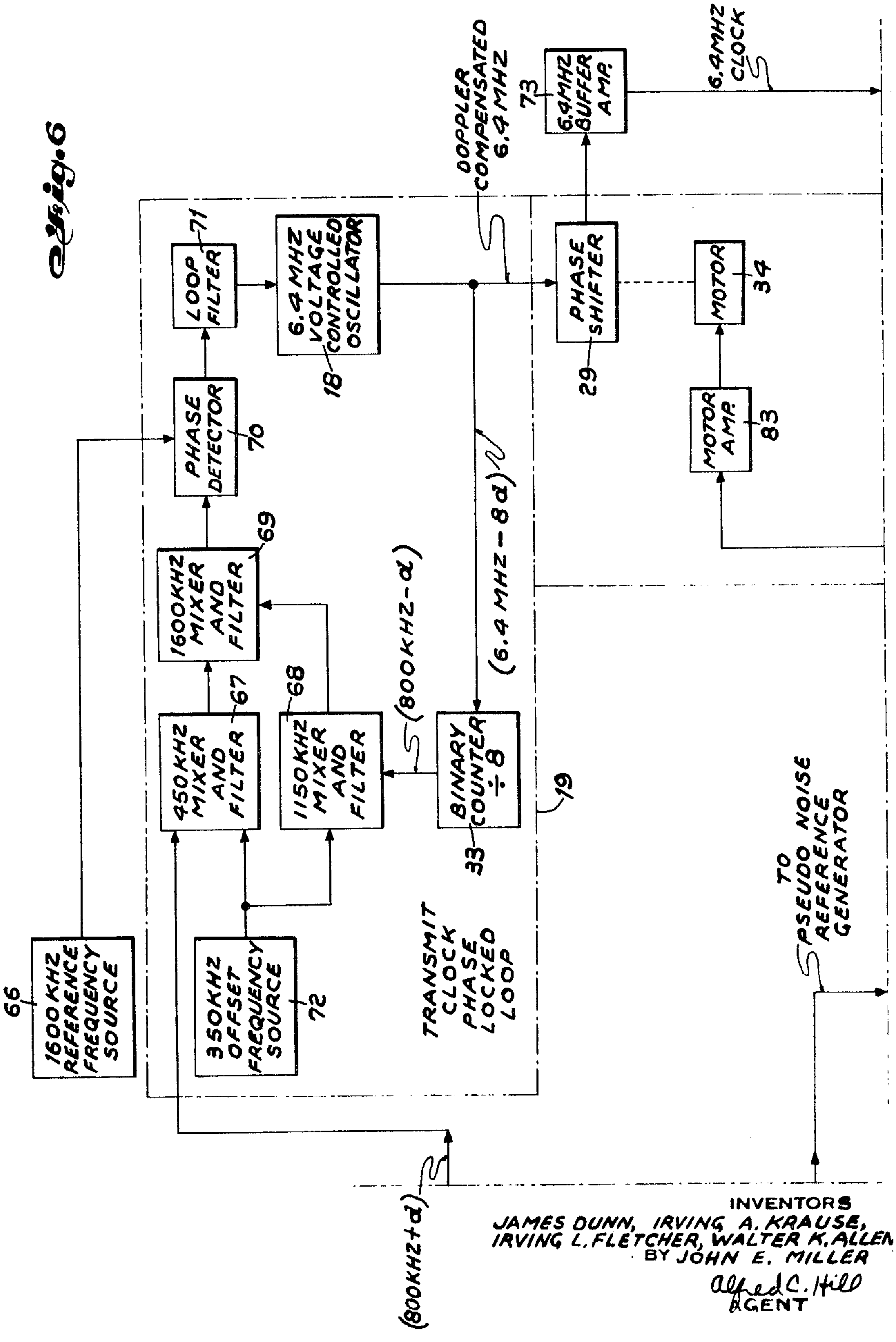

Subcarrier tracking phase lock loop 27 is used to demodulate the received pseudo noise code ranging signal. The demodulated pseudo noise signal is compared with the demodulated sync burst as follows. Receive timer 22, which is locked to the demodulated sync burst, generates a reference sequence in generator 28 (FIG. 8). This reference sequence is compared with the demodulated pseudo noise code in the pseudo noise ranging phase lock loop 24 including therein cross correlators. The phase of the transmit timer 17 is stepped until a lock to within a fraction of a burst is obtained. Once this approximate lock has been obtained, the timing error between the received and reference pseudo noise code sequences is measured. The timing error signal is used to correct the phase of the timing signals of transmit timer 17 digitally and then by a motor driven phase shifter 29 (FIG. 6). Once the pseudo noise ranging phase locked loop 24 has slewed in, it tracks the residual frequency error of the doppler compensation system described above.

The foregoing has been a brief summary of the operation of the equipment shown in FIGS. 4, 5, 6, 7, 8 and 9 for both a master station and a slave station. The description will now proceed with a more detailed description of the various functional blocks of this equipment. As pointed out herein above the equipment of FIGS. 4, 5, 6, 7, 8 and 9 include all the equipment necessary to make the station operation as a master or slave station. In the master station the transmission of the master sync is enabled and the pseudo noise ranging signal is disabled. In the slave station the transmission of master sync is disabled and the pseudo noise ranging system is enabled.

The operation of the various components in a terminal are related to one another. The received IF enters the station at the 70 MHz. IF distributor 30 which consists of a set of buffer amplifiers arranged to provide demodulator IF, carrier IF and subcarrier IF. The demodulator IF provides an input to unit 31 wherein the communication data is demultiplexed, demodulated and otherwise processed for utilization. The carrier IF is the input to carrier-tracking phase locked loop 20 where the master sync signal is extracted. The subcarrier IF is the input to subcarrier-tracking phase locked loop 27 where the pseudo noise code is extracted.

The carrier-tracking phase locked loop 20 is used as a phase demodulator as will be described in further details hereinbelow.

The demodulated signal is used to lock a 6.4 MHz. voltage controlled oscillator 32 in the receive clock tracking phase locked loop 21. Since the 800 kHz. in the received sync burst contains the repeater to ground doppler, a clock is obtained which is proportional to the receive frame interval. The phase-locked loop 21 also serves as a narrow band filter for the incoming 800 kHz. sync signal. Included in receive clock tracking phase locked loop 21 is a set of correlators which measure the phase integrity of local receive frame referenced with the incoming sync and local frame clock. Phase-locked loop 21 will be described in further detail hereinbelow.

The local receive frame interval and other necessary timing signals are generated by receive timer 22. Receive timer 22 consists of a set of binary counters clocked from the 6.4 MHz. voltage control oscillator 32 in the receive tracking local phase-locked loop 21 which are arranged to generate the timing signals necessary in the operation of the equipment. Since the clock driving these counters is receive doppler compensated, the receive frame is correct in frequency. The receive frame is phase corrected by receive slew control and receive mode control based on correlator outputs from phase-locked loop 21 which will be described in greater detail hereinbelow.

All time references for the receive frame interval are provided by receive timer 22. These include a signal to gate carrier tracking phase-locked loop 20, reference signals to receive clock-tracking phase-locked loop 21, sync reference signals to drive the sync early-late correlator, pseudo noise reference signals to drive the pseudo noise ranging phase locked loop correlators, burst reference signals to the received channel gates which are used by unit 31 to demultiplex data channels, and 800 kHz. receive signal to transmit clock phase-locked loop 19.

In phase locked loop 19, the received 800 kHz. is added to locally generated 800 kHz. signals the resultant is then compared to a 1600 kHz. frequency reference. The resulting error in turn drives the 6.4 MHz voltage controlled crystal oscillator 18 from which the local 800 kHz. was derived by dividing the 6.4 MHz. by 8 in binary counter 33. This arrangement forms a phase-locked loop which in conjunction with phase-locked loop 21 forms the equipment to obtain doppler compensation.

To compensate for secondary effect of doppler and to correct for the other factors, such as error in standards, mechanical phase shifter 29 driven by a servomotor 34 adjusts the phase of the output signal from oscillator 18 for use as the clock for the transmit timer 17.

The transmit timer 17 is structurally identical to receive timer 22. It consists of a set of three binary counters arranged to count out the transmit frame interval. All time references of the transmit frame interval are derived from transmit timer 17. When the receive and transmit phase locked loops are locked and the proper drive is provided to servomotor 34, the transmit frame is correct in frequency.

The transmit frame is phase corrected through logic in transmit slew control and transmit mode control based on the correlator outputs from pseudo noise-ranging phase-locked loop 24 as will be described in greater detail hereinbelow. The servo and phase correction logic for transmit timer 17 are only used in a slave terminal. The transmit timer in a master terminal is considered the reference. Therefore, under normal conditions, the servomotor and the slew control are made inoperative in a master terminal.

All timing signals for the transmit frame interval are derived from transmit timer 17. These signals include a gate signal to generate the master sync burst, signal to modulate the master sync burst, burst signals to derive the fill burst selector switches, burst signals to derive the pseudo code generator, burst clock signals to unit 35 (FIG. 9) to control the modulation and multiplexing and other processing of data from the sources of data for transmission purposes, and burst reference signals to drive the transmit channel gates which are used by unit 35 to time the multiplexing of data channels.

The master sync signal from generator 13 is used to phase modulate the output of the 68 MHz. oscillator 14 in modulator 15 whose output is gated by gate 16 into summer amplifier 36. The unmodulated 68 MHz. carrier is also gated into summer 36 to select the fill bursts. As mentioned before the master sync transmission is only operative when the station is a master.

For a slave station, the subcarrier is enabled. The output of the pseudo noise generator 37 modulates the output of 70 MHz. subcarrier oscillator 25 in modulator 26 whose output is gated into summer 36 by transmission gate 38. The summer 36 mixes the carrier, subcarrier and output of modulator unit 35 and presents these signals to the station transmitter for transmission.

In the pseudo noise-ranging circuit the subcarrier IF is coupled through a 70 MHz. band pass filter and limiter 39 and buffer amplifier 40. The output of amplifier 40 drives the subcarrier tracking phase locked loop 27 which acts as a phase demodulator. The received pseudo noise code at the baseband output of phase locked loop 27 is correlated with the reference pseudo noise code supplied by generator 28 activated by receive timer 22 at the pseudo noise ranging correlators. The output of the correlators provide the basis for adjusting the transmit timer phase.

Figures 7, 13, 17:
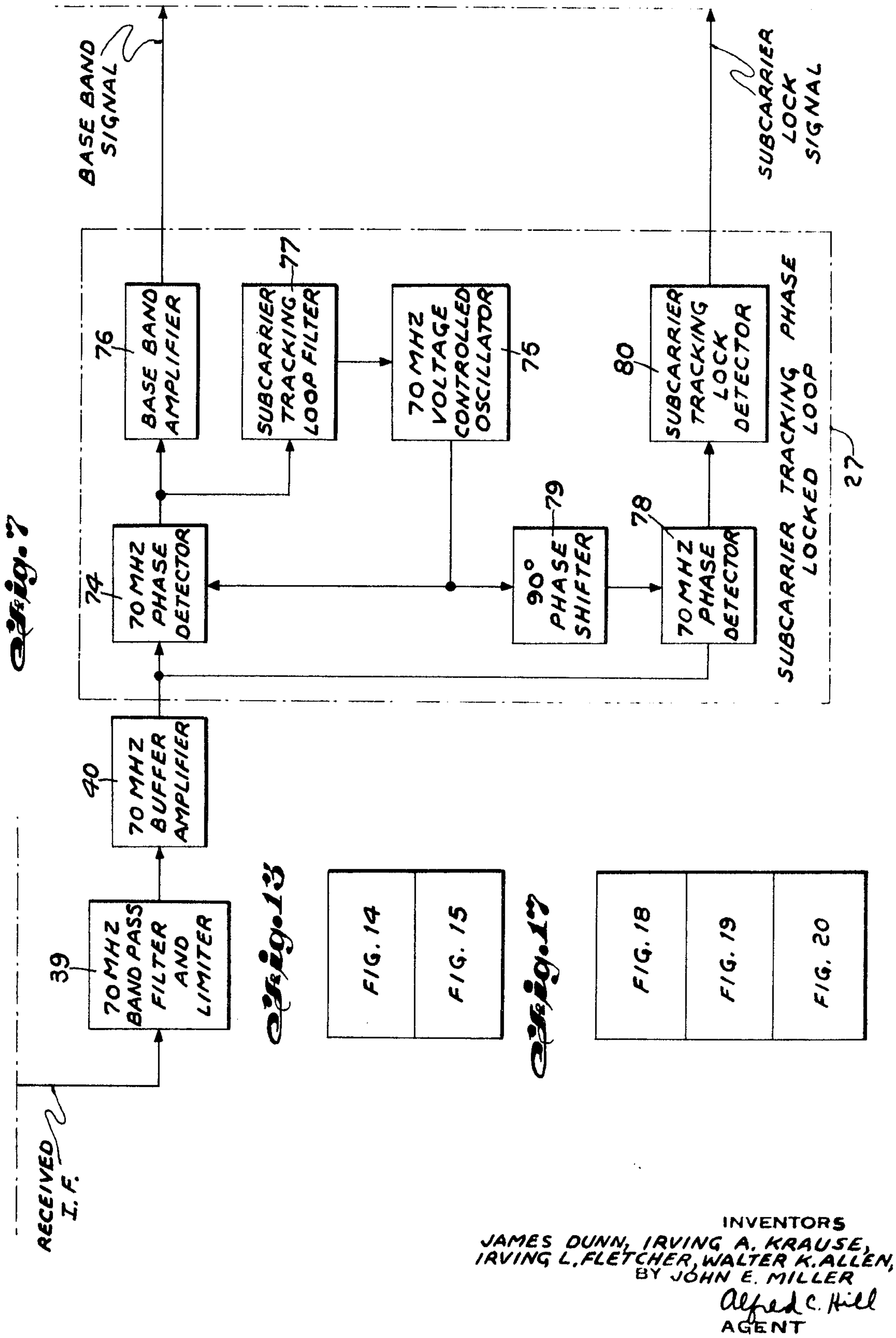
FIG. 13 illustrates the manner in which the sheets of drawings containing FIGS. 14 and 15 should be arranged.
FIG. 17 illustrates the manner in which the sheets containing FIGS. 18, 19 and 20 should be arranged.

The station equipment of FIGS. 4, 5, 6, 7, 8, 9 will now be described more specifically. Referring to FIG. 4, the received IF signal coupled to distributor 30 which includes therein buffer amplifiers 41 and 42 to couple the IF signal to locked loop 20, buffer amplifier 43 to couple the IF signal to unit 31 which is not part of the synchronization system, and buffer amplifier 44 to couple the IFsignaltothe phase-locked loop 27 (FIG. 7). Phase-locked loop 20 locks to the sync burst received from the master station via the repeater by employing phase detector 45 coupled to the output of amplifier 41 and to the output of voltage controlled oscillator 46 through buffer amplifier 47. The error signal at the output of detector 45 is gated by sampling gate 48 during the 10 microsecond period that the sync burst is received, the gate signal being received from receive timer 22. This gate signal is normally a +3 volt signal which holds gate 48 open. During the sync burst, this gate signal goes to 0 and closes gate 48.

The reasons for gating the error signal in phase-locked loop 20 are to reduce the effect of noise, which is present during the entire frame, and to prevent signals other than the sync burst from pulling the loop frequency.

The output from gate 48 passes through rise time network 49 before applying it to loop filter 50 to prevent the step voltage at the output of gate 48 from overloading the operational amplifier in the loop filter circuit. Network 49 also has the advantage of providing a low source impedance for the loop filter during the time gate 48 is opened. This is significant because otherwise stray capacitance on this line would effect the loop filter gain by acting as a holding capacitor.

The incoming carrier frequency can be ±400 kHz. from its normal value due to doppler and local oscillator frequency tolerances. Locked loop 20 tracks over this range with a maximum phase error of 9°.

A lock detector is provided by supplying phase detector 51 with the output signal of oscillator 46 shifted by 90 ° in phase shifter 52. This phase shift can be provided by the proper length of coaxial cable. The output of phase detector 51 is also gated by sampling gate 53 to reduce the effect of noise and to drive lock detector 54. The output of detector 54 is normally +3 volts and goes to 0 when lock is detected.

The demodulated 800 kHz. sync signal appears at the output of detector 45. However, a separate phase detector 55 is coupled to the output of oscillator 46 and amplifier 42 to extract the baseband to avoid loading effects on the sampling gate 48 following phase detector 45. Phase detector 55 has its output coupled to baseband amplifier 56 which provides voltage gain, buffering and also inversion if required. Phase-locked loop 20 will lock in a stable manner at integral multiples of the sampling rate of approximately 800 Hertz from the incoming carrier frequency. This is due to the pulse nature of the incoming sync burst and occurs whether the loop is gated or not.

Figure 5:
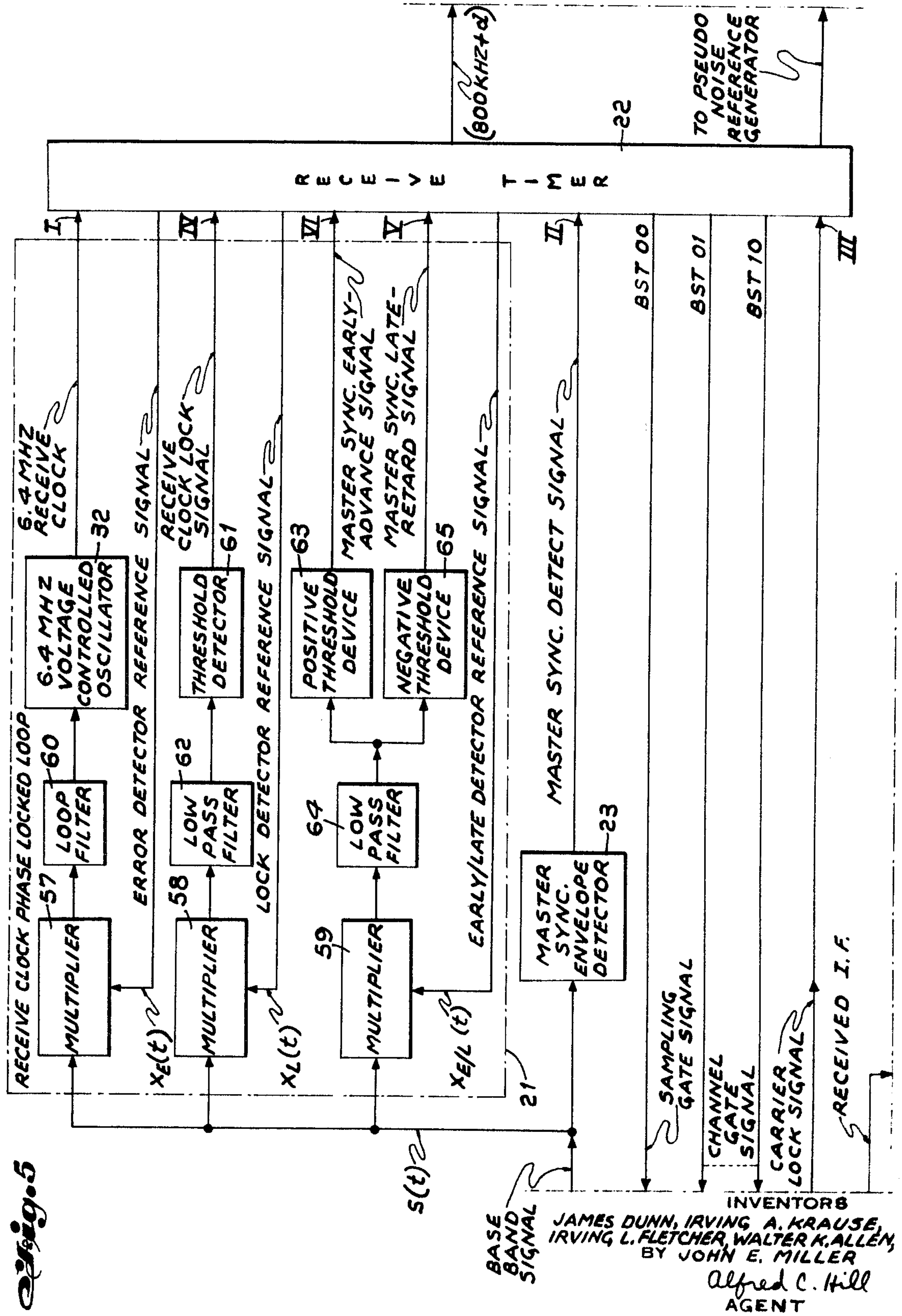

Referring to FIG. 5, receive clock phase-locked loop 21 is in effect a gated loop due to the reference signals applied to multipliers 57, 58 and 59 from receive timer 22. Loop 21 operates on the received master sync burst supplied from amplifier 56 (FIG. 4). Loop 21 tracks the doppler on the 800 kHz. tone in the demodulated sync burst and provides a continuous 800 kHz. clock to operate transmit timer 17.

Figure 10:
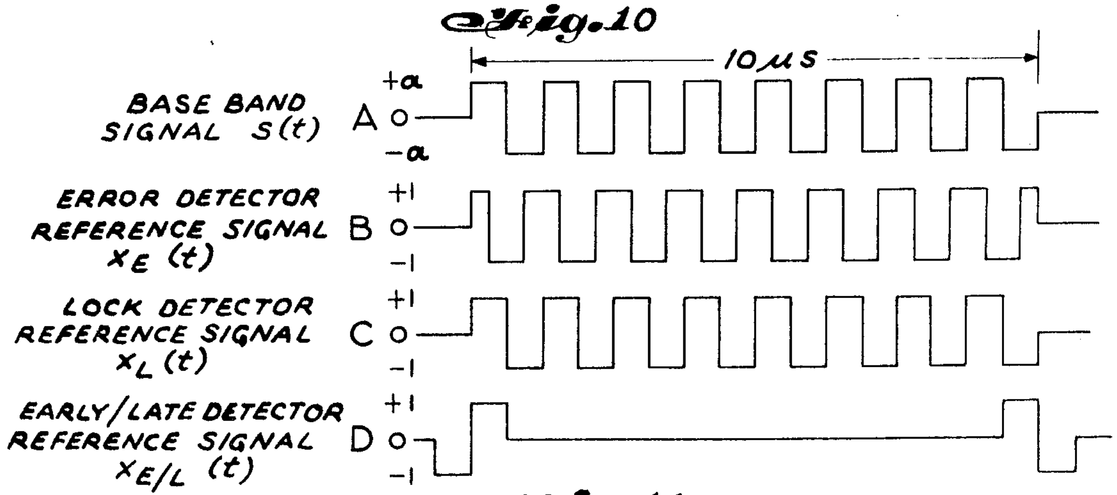
FIG. 10 is a timing diagram illustrating the signals identified in the receive clock phase locked loop of FIG. 5.

The input to loop 21 is the demodulated signal from amplifier 56 of loop 20 identified as $S(t)$ and illustrated in Curve A, FIG. 10. This signal drives multiplier 47 which is the phase error detector for the loop having applied thereto reference signal $X_E\ (t)$ as shown in Curve B, FIG. 10. The baseband signal also is applied to multiplier 58 together with a reference signal $X_L(t)$ as illustrated in Curve C, FIG. 10 which is used for the lock detector. Since loop 21 can lock an integral number of clock cycles from the correct time, a means for detecting the leading and trailing edges of the sync burst is provided by multiplier 59 coupled to the baseband signal input and to the reference signal $X_{E/L}\ (t)$ supplied from receive timer 22 as illustrated in Curve D, FIG. 10.

When the input and reference signals are aligned in time, as illustrated in FIG. 10, the output from multiplier 57 will be a burst of 1600 kHz. square wave and will have an average value of zero. Loop filter 60 passes only this DC term which then corrects the phase of the receive clock provided by oscillator 32. For a timing error less than one-quarter a clock period, the DC value is proportional to the timing error.

The output of multiplier 58 has a maximum DC value when its two inputs are correctly aligned in time and reaches zero when the timing error equals one-quarter clock period. The DC component of the output of multiplier 58 is applied to threshold detector 61 through low pass filter 62. Detector 61 has the threshold adjusted for one-half the maximum and corresponds to a timing error of one-eighth clock period or 157 nanoseconds.

Multiplier 58 has false peaks for timing errors of ±1.25 microseconds, ±2.5 microseconds, etc. In addition, these timing errors correspond to stable nulls in the loop. The output of multiplier 59, the early-late detector, has a zero DC value for the correct lock position. If the master sync burst is early, that is, S (*t*) leads $X_L$ (*t*) (Curves A and C, Fig. 10) then multiplier 59 has an output which is a maximum positive DC value when the timing error is +1.25 microseconds, etc. The positive threshold as established in threshold device 63 which receives its input from low pass filter 64 is adjusted for one-half this maximum DC value. Thus, for a false lock, in which the sync burst is early by an integral number of clock periods, threshold device 63 generates an advanced signal for receive timer 22.

Upon receipt of this signal and in the automatic mode, receive timer 22 advances one clock period, that is, 1.25 microseconds. If the sync burst is still early after waiting a period of approximately 0.1 second, timer 22 advances again. This process repeats until the loop reaches the correct lock.

A similar procedure is followed when the sync burst is late by an integral number of clock periods employing negative threshold device 65.

Details of receive timer 22 and the manner of controlling the same from the output signals of locked loop 21 will be described hereinafter with reference to FIGS. 14 and 15.

Referring to FIG. 6, the 800 kHz. +*d* output of receive timer 22 is coupled to transmit clock phase locked loop 19. Locked loop 19 compensates the transmit clock for first order doppler effects and the servo driven phase shifter 29 compensates for secondary clock errors. The doppler compensation circuit consists of a source of reference frequency 66, a mixer arrangement including mixers and filters 67, 68 and 69 to form a 1600 kHz. resultant signal at the output of mixer and filter 69 for application to phase detector 70 which receives its other input from source 66. It is necessary to avoid mixing the transmit and receive 800 kHz. clocks directly, otherwise, the sum frequency could not be distinguished from the second harmonics of the two input frequencies. The receive 800 kHz. is mixed with a 350 kHz. offset frequency signal from source 72 in mixer and filter 67 and the 450 kHz. difference signal is extracted. The transmit 800 kHz. signal from counter 33 is mixed with the offset frequency signal from source 72 in mixer and filter 68 and the 1150 kHz. sum frequency is extracted. The output signals from mixers and filters 67 and 68 are mixed in mixer and filter 69 to form the desired 1600 kHz. sum frequency. The output from detector 70 drives loop filter 71, which in turn, controls the voltage controlled oscillator 18. The output of oscillator 18 is divided by counter 33 to provide the transmit 800 kHz. −*d*. The receive 800 kHz. +*d* is from the repeater to this station only. Therefore, when the loop is locked the transmit clock will be doppler compensated.

The above description completes the description of the transmit phase locked loop 19 as it is used in master terminal. The motor-driven phase shifter 29 is inactive in the master station. However, this phase shifter 29 is used in a slave terminal as follows.

Secondary transmit clock error corrections are implemented by taking the output from oscillator 18 which is doppler compensated and phase shifting it in the servo driven phase shifter 29. The output of phase shifter 29 then provides a clock which is corrected for all other timing errors, assuming that the proper drive is applied to servo motor 34. This function is made part or the loop to generate the proper servo drive. One such loop is the pseudo noise ranging phase locked loop 24 (FIG. 8).

Phase shifter 29 is a mechanical device which introduces a phase shift by varying the dielectric between capacitor plates.

The output of phase shifter 29 is coupled through buffer amplifier 73 to transmit timer 17 which will be described in greater detail in connection with FIGS. 18 19 and 20 hereinbelow.

Referring to FIG. 7, there is illustrated therein the components forming subcarrier tracking phase locked loop 27. This loop is used as a phase demodulator for the pseudo noise ranging signal. The main difference between this loop and the carrier tracking phase locked loop is that loop 27 is not gated. The input to loop 27 is filtered at IF in band-pass filter and limiter 39 to remove the master sync signal and other data channel signals which are received on the subcarrier frequency from the repeater. The band-pass filter is followed by a limiter to remove amplitude variations caused by signal suppression effects on the low level pseudo noise-ranging signal. The output from filter and limiter 39 is coupled by means of buffer amplifier 40 to locked loop 27 which includes phase detector 74 receiving one input from amplifier 40 and another input from voltage controlled oscillator 75. The output from detector 74 which is the baseband signal is applied to baseband amplifier 76 and also to loop filter 77 to control oscillator 75. To provide the lock detector, the output from amplifier 40 is coupled to phase detector 78 which has its other input coupled to oscillator 75 through the 90° phase shifter 79. The output from phase detector 78 is coupled to subcarrier tracking lock detector 80 to provide indication of when loop 27 is locked.

Referring to FIGS. 6 and 8, pseudo noise ranging phase locked loop 24 is illustrated which is used to adjust the phase of the transmit timer (FIG. 9) in a slave station during initial acquisition. The correct phase is determined by comparing the time at which the slave station's pseudo noise-ranging signal is received from the repeater against time the master sync burst is received from the repeater. To facilitate this comparison, a reference pseudo noise signal is generated by generator 28 in response to receive timer 22 (FIG. 5) which itself is locked in time to the received master sync burst.

The carrier-tracking phase-locked loop 20 (FIG. 4) and receive timer 22 (FIG. 5) operate from the sync burst received via the repeater from the master terminal. The pseudo noise reference signal at the output of generator 28 can then be assumed to be fixed in time as far as the slave terminal is concerned.

The purpose of locked loop 24 is to correct the initial phase of the slave stations transmit timer 17. This is actually accomplished in three modes. The first two modes are a digital advance or retard of transmit timer 17. The third mode is a phase correction by motor driven phase shifter 29 which operates on the 6.4 MHz. output of oscillator 18 (FIG. 6). The three modes in the acquisition procedure are: (1) coarse slew is a search in which the phase of transmit timer 17 is advanced in steps on the order of 5 microseconds until pseudo noise lock occurs; (2) fine slew wherein transmit timer 17 is digitally advanced or retarded in steps on the order of 0.5 microseconds depending on whether the received pseudo noise signal is early or late; and (3) maintenance where a fine phase adjustment is obtained by means of phase shifter 29 according to the output of the pseudo noise error detector including multiplier 81, loop filter 82 and motor amplifier 83.

The acquisition procedure depends on the outputs of the three multipliers 81, 84 and 85 shown in FIG. 8. The demodulated pseudo noise signal coupled from baseband amplifiers 76 of phase locked loop 27 (FIG. 7) is denoted S (*t*) and is illustrated in Curve A, FIG. 11. The reference signals for multiplier 81, 84 and 85 are provided by generator 28 and are respectively denoted $X_E$ (*t*) as illustrated in Curve B, FIG. 11; $X_L$ (*t*), as illustrated in Curve C, FIG. 11; and $X_V$(*t*), as illustrated in Curve D, FIG. 11. The operation of multipliers 81, 84 and 85 are illustrated in the timing diagram of FIG. 11. The signal S (*t*) is shown correctly aligned in time with the various reference signals. Under this condition of correct timing, the receive pseudo noise signal S (*t*) and the locked detector reference signal $X_L$ (*t*), have the same waveform and are in phase.

Multiplier 84 and low-pass filter 86 form a cross correlator and are the components employed in the lock detector. This is followed by a threshold detector 87 to indicate lock The 11 bit pseudo noise pattern has a two level auto correlation function as illustrated in Curve A, FIG. 12. It can be seen that lock is indicated whenever the timing error is less than approximately 5 microseconds. The indication of lock is used to stop the mode one search.

Figure 11:
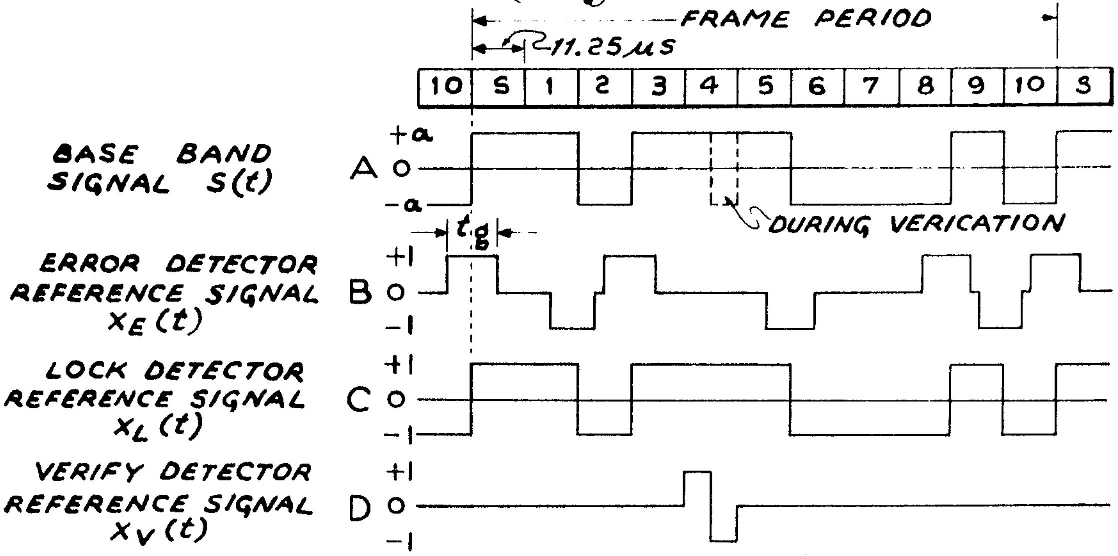
FIG. 11 is a timing diagram illustrating the signals present in the pseudo noise ranging phase locked loop of FIG. 8.

The reference input to multiplier 81 is indicated in Curve B, FIG. 11. It consists of positive gating pulse of width $t_0$ when S ($t$) has a positive going transition and a negative gating pulse on a negative going transition. This results in the error detector characteristic in Curve B, FIG. 12.

The input to loop filter 82 has a holding capacitor. The result of the holding capacitor is that the DC value of the output of multiplier 81 is equal to the output of a sampling gate multiplier averaged only over the time the gate is closed. It is this DC value versus timing error which is shown in Curve B, FIG. 12. It can be seen that, provided the cross correlator indicates pseudo noise lock, the error detector will sense the direction of error.

The error signal at the output of multiplier 81 is amplified by loop filter 82 and applied to early and late threshold devices 88 and 89, respectively, through low-pass filter 90. Detectors 88 and 89 sense the direction of error and cause transmit timer 17 to be stepped in phase during mode two fine slew. The error signal at the output of loop filter 82 is also applied to motor amplifier 83 and motor 34 to control phase shifter 29 for fine timing corrections in mode three acquisition.

Figure 12:
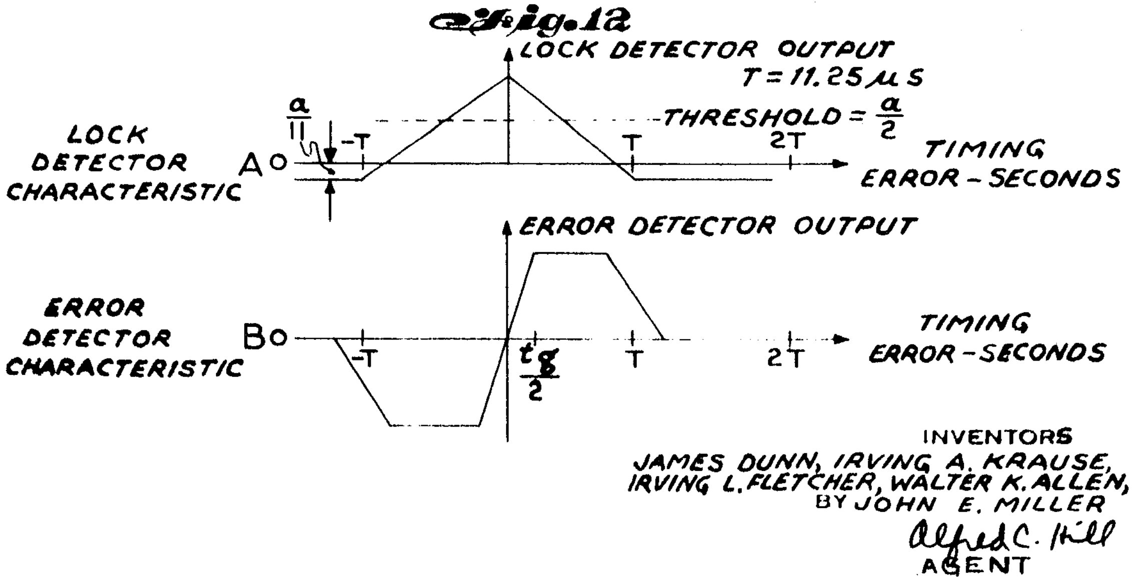
FIG. 12 illustrates the characteristic of the lock detector and error detector of the pseudo noise ranging phase lock loop of FIG. 8.

Inspection of Curve B, FIG. 12 illustrates that when the magnitude of the timing error is less than $t_0/2$, the error decrease output is proportional to the timing error with the constant of proportionality $k_E=2a/t_0$. Clearly, the error detector gain $D_E$ increases as $t_0$ is made smaller. On the other hand, the action of the holding capacitor in filter 82, is such that the noise power output is constant as $t_0$ is decreased.

The pseudo noise loop could have been designed without a holding capacitor. This would have resulted in an error detect gain detect gain $K_E$ which was independent of $t_0$ and a noise power output proportional to $t_0$. The net result would have been the same timing error jitter as with the holding capacitor, but would require more DC gain in the loop filter 82 for the same loop bandwidth.

The early and late threshold devices 88 and 89 are adjusted to one-half the maximum voltage output of filter 82. These thresholds correspond to a timing error of $t_0/4$.

Because the pseudo noise ranging signal is continuous, it will suffer interference from the sync burst and also from any data bursts which may be present. The actual cross correlator output characteristic may have false peaks due to this interference which may exceed the lock detector 87 threshold. A verification for correct lock is provided to ensure that lock has not occurred on a false peak. The slave will also be attempting to position its transmit timer phase so that it can transmit data in a given time slot, for instance, channel 4. In this case, it is known in advance that this time slot is not occupied. During verification, the transmitted pseudo noise ranging signal is modified as indicated by the dotted portion of Curve A, FIG. 11 to an alternate polarity during channel 4 time slot according to the transmit timer. If the transmit timer is correctly phased, this split bit will be received during the channel 4 time slot as defined by receive timer 22 (FIG. 5). Generator 28 activated by receive timer 22 generates reference signal $X_V(t)$, as illustrated in Curve D, Fig. 11, which is cross correlated in multiplier 85 with the received pseudo noise ranging signal. In the event transmit timer 17 is correctly aligned, the output of multiplier 85 will be passed by low pass filter 91 to threshold detector 92 to provide the verified signal which will be utilized to light a lamp on the control panel to indicate that the slave station is ready to transmit data.

Figure 9:
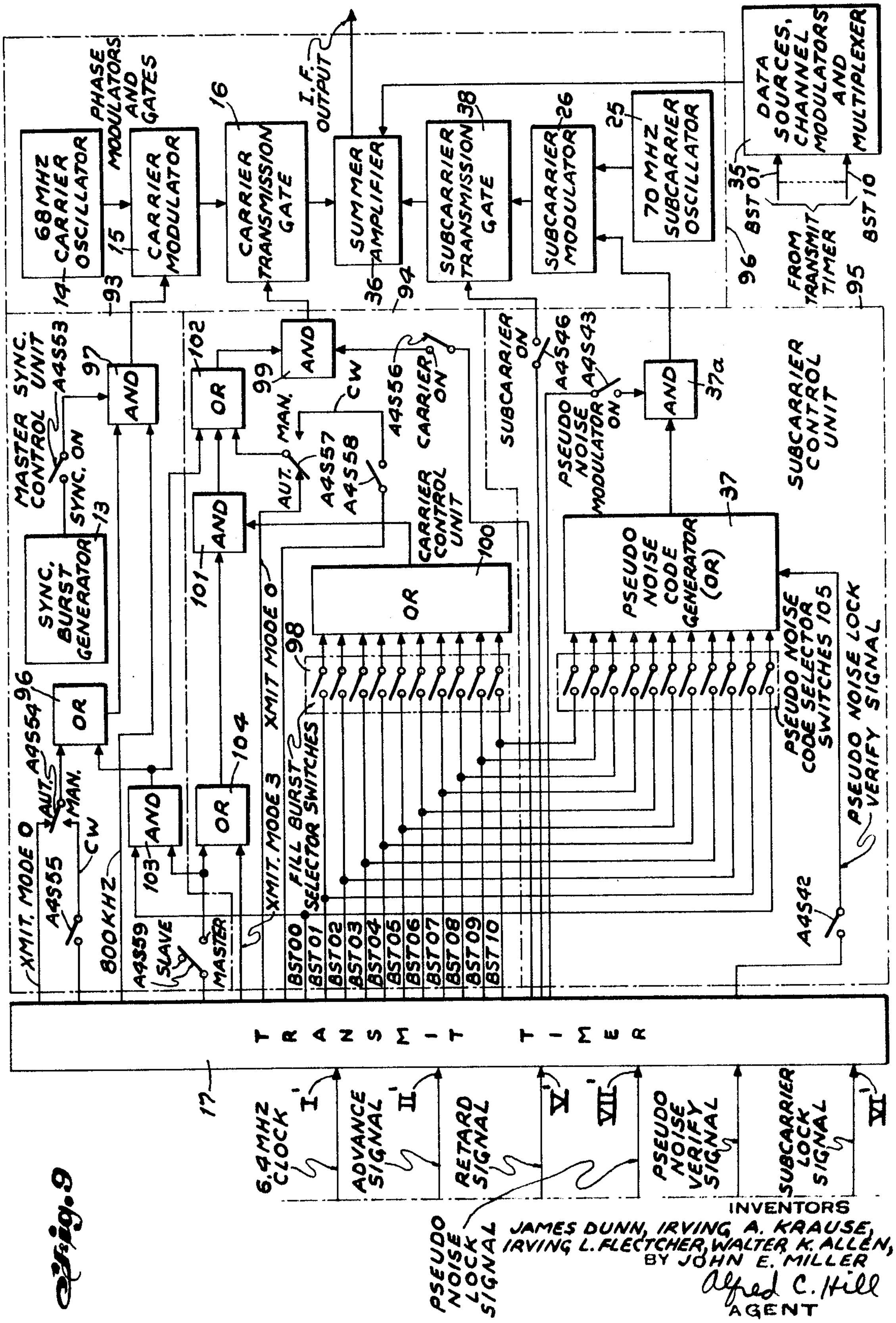

Referring to FIG. 9, there is illustrated therein a simplified block diagram of the arrangement to control the transmission of the various IF signals for application to the station transmitter, all of which are under control of transmit timer 17. The transmit control arrangement includes a master sync control unit 93, carrier control unit 94, subcarrier control unit 95 and phase modulators and gates 96.

The components of master sync control unit 93 generates the signal input to carrier modulator 15. The modulator operation is controlled by three front panel namely, modulator on-off switch A4S53, automatic-manual selector A4S54 and pulse—CW selector A4S55.

Switch A4S54 selects whether modulator 15 is controlled by the setting of switch A4S55 through means of OR gate 96 and AND gate 97 or by the transmit mode register state. When switch A4S54 is set to manual modulator 15 is controlled by A4S55 and it is independent of the transmit mode. When A4S54, is set to automatic modulator 15 is controlled by the transmit mode. In transmit mode 0, the 800 kHz. is CW and this clock signal is pulsed in any other transmit mode.

Carrier control unit 94 generates the control for carrier transmission gate 16 which connects and disconnects carrier modulator 15 output to summer 36. When gate 16 is closed, the 68 MHz signal from modulator 15 is connected to the summer and provides a transmit IF. When gate 16 is open carrier transmission is inhibited.

The carrier control unit 94 is controlled by the following elements; (1) switch A4S56 (carrier on-off); (2) switch A4S57 (carrier control manual-automatic selector); (3) switch A4S58 (pulse—CW selector); and (4) switches 98 (fill burst selectors).

Switch A4S56 enables AND gate 99 to drive gate 16. Switch A4S57 selects whether the pulse—CW drive signal is derived from the transmit mode register or from the setting of A4S55. If switch A4S57 is set to automatic, the carrier will be CW in transmit mode 0 and it will be pulsed in any other transmit mode. If switch A4S57 is set to manual, the carrier will be controlled by A4S58 and will be independent of the transmit mode state.

Switches 98 enable the selection of the bursts BST00 to BST10 from transmit timer 17 through OR gate 100 and, hence, through AND gate 101 and OR gate 102 to AND gate 99.

Additional control on the output of AND gate 99 is exercised by the master-slave selector switch A4S59. In a master terminal, with switch A4S59 in the master position the master burst interval pulse generating circuitry is enabled by enabling AND gate 103. This results in gate drive during the master sync interval provided switch A4S56 is on. However, if the station is a slave station, carrier transmission is only enabled during transmit mode 3 through OR gate 104 and the circuitry which generates the master sync interval pulse AND gate 103 is disabled.

Figure 18:
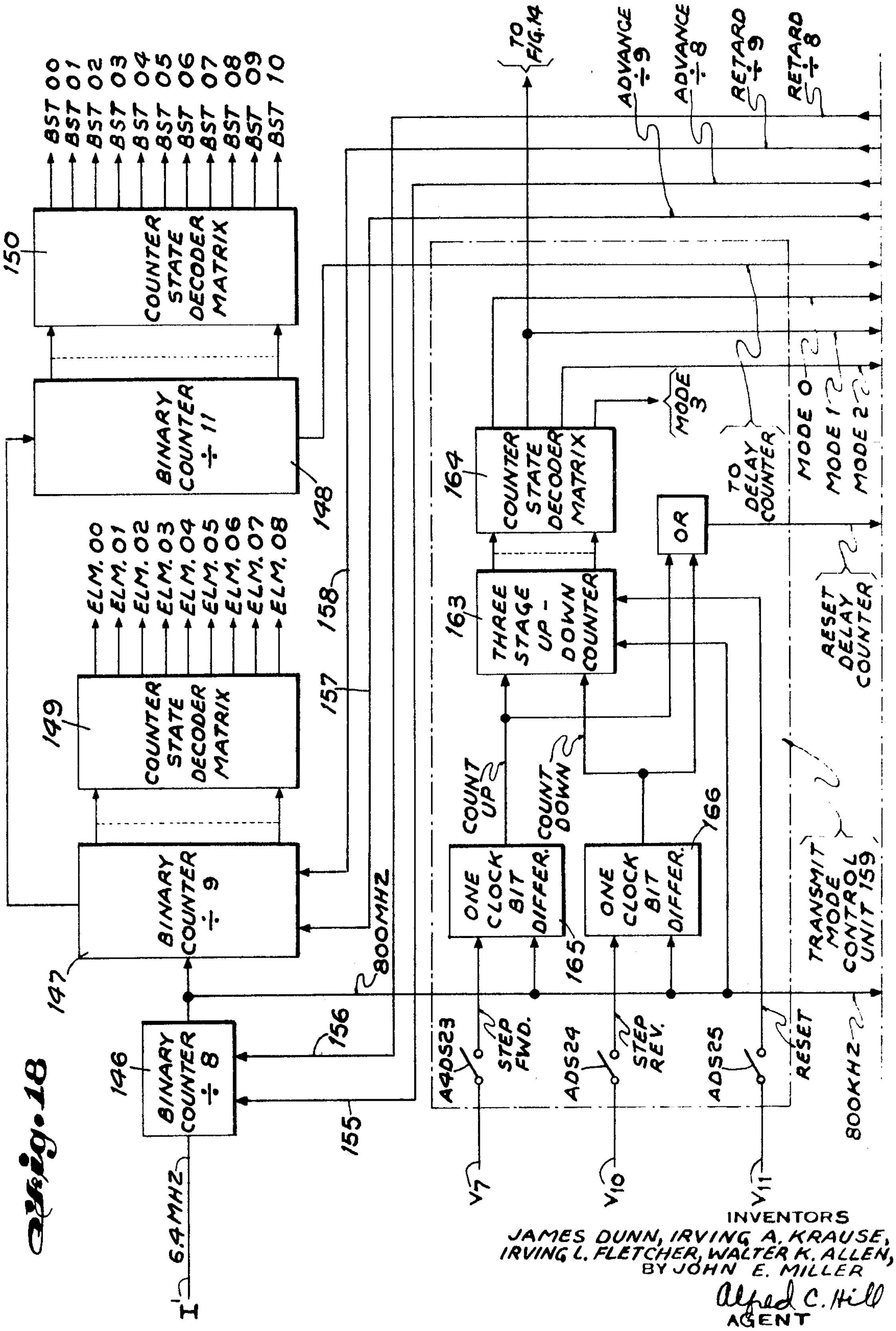
FIGS. 18, 19 and 20, when arranged as illustrated in FIG. 17, is a block diagram of the transmit timer and the control circuitry therefore in accordance with the principles of this invention.

The 11 states of a divide-by-11 binary counter are provided as output of transmit timer 17 labeled BST00 to BST10 (note FIG. 18). The state corresponding to the master sync interval is connected to AND gate 103. When the terminal is a master, that is, when switch A4S59 is in the master position, a pulse will appear at the output of AND 103 every time transmit timer 17 is in the master sync state. The output of AND gate 103 is applied to OR gates 96 and 102. If the other input of OR gate 96 is not active, AND gate 97 will be enabled for each master sync interval only. This will result in 800 kHz. pulses being applied to modulator 15 provided switch A4S53 is on. The other input to OR gate 96 is derived from switch A4S54. When this input is not active, the operation is as described above and modulator 15 is driven by the 800 kHz. pulses. When this other input of OR gate 96 is active, it enables AND gate 97 continuously and thereby drives modulator 15 with a continuous 800 kHz. signal. The output signal of switch A4S54 is determined as follows: (1) when in the automatic position, output is active only in transmit mode 0; and (2) when in the manual position, output is active only if switch A4S55 is in the CW position.

Transmission gate 16 is operated as follows. The output of AND gate 99 enables transmission gate 16, therefore, whenever an output appears at the output of OR gate 102, the transmission gate will be enabled provided switch A4S56 is on. OR gate 102 has three inputs, namely, the output of AND gate 103, the output of AND gate 101 and the output of switch A4S57. The output of AND gate 103 will turn the carrier on during the master sync interval only provided switch A4S56 is on. However, there will be no output at AND gate 103 unless the station is a master as controlled by switch A4S59.

The output of AND gate 101 is a set of pulses in the transmit frame interval where each pulse corresponds to a selected fill burst. This circuitry is implemented by providing the burst intervals BST00 to BST10 at the output of transmit timer 17 as discussed above. The master sync interval BST00 drives AND gate 103. The remaining 10 lines each go to fill burst selector switch 98 with the outputs of all these switches being the inputs to OR gate 100. Therefore, for each of the switches 98 that is closed OR gate 100 will deliver an output when the divide-by-11 counter of transmit timer 17 is in the associated state. The output of OR gate 100 drives and gate 101. The output of OR gate 96 is always active if the terminal is a master and is active in mode 3 only if the station is a slave. In the absence of an input from switch A4S57 the carrier will be pulsed at the indicated burst intervals. However, a continuous active output from switch A4S57 will enable transmission gate 16 continuously thereby transmitting a CW carrier. The output of switch A4S57 is determined as follows: (1) when switch A4S57 is in automatic position, provide an output in transmit mode 0 and no output in any other transmit mode; (2) when switch A4S57 is in the manual position, there will be provided output whenever switch A4S58 is set to CW and no output whenever A4S58 is open or in the pulse position regardless of the transmit mode.

In the actual circuitry, the outputs of AND gates 103 and 101 are retimed before they are applied to OR gate 102 to shape the pulse to exclude the guard time from the burst interval. This, in effect, disables transmission gate 16 during guard time in pulsed operation.

Subcarrier control unit 95 consists of two functions: (1) subcarrier on-off; and (2) subcarrier modulation input.

Subcarrier on-off control is a front panel switch A4S46 which controls the drive to gate 38. When this switch is closed, it closes transmit gate 38 thereby connecting the output of modulator 26 to summer 36 and thus provides the subcarrier IF. When switch A4S46 is off, it opens gate 38.

The subcarrier modulator input control consists of the pseudo noise code generator 37 and the modulator on-off control switch A4S43. When switch A4S43 is on, it connects the output of generator 37 to the input of modulator 26 through AND gate **37*a*. When switch A4S43 is off, it disconnects modulator 26**.

The pseudo noise code is generated in coder 37. Each of the 11 decoded states of the transmit divide-by-11 counter goes to a switch in selector switches 105. The output of each of the 11 switches goes to an OR gate. With this arrangement, a signal will appear at the output of the OR gate whenever the divide-by-11 counter is in a state for which the corresponding switch is closed. Consequently, the pseudo noise code consists of an 11 bit pattern mapped directly onto the transmit frame.

It should be pointed out that a similar arrangement can be employed for generator 28 (FIG. 8) which generates the pseudo noise signal for use in phase-locked loop 24. The IF circuitry or phase modulator and gates 96 consist of a 68 MHz crystal oscillator 14, phase modulator 15 and transmission gate 16 arranged to provide the carrier transmit IF signal. The subcarrier IF circuitry consists of 70 MHz crystal oscillator 25, phase modulator 26 and transmission gate 38 arranged to provide the subcarrier transmit IF signal. In each of these two arrangements, the crystal oscillator provides a signal to phase modulator. This signal is phase modulated and through the transmission gate provides input to the summer amplifier 36. Amplifier 36 has 3 inputs; (1) outputs from transmission gate 16, (2) outputs from transmission gate 38 and outputs from the channel modulators and multiplexer unit 35. The output of amplifier 36 is a transmit IF signal which is the input to the station transmitter.

Figure 14:
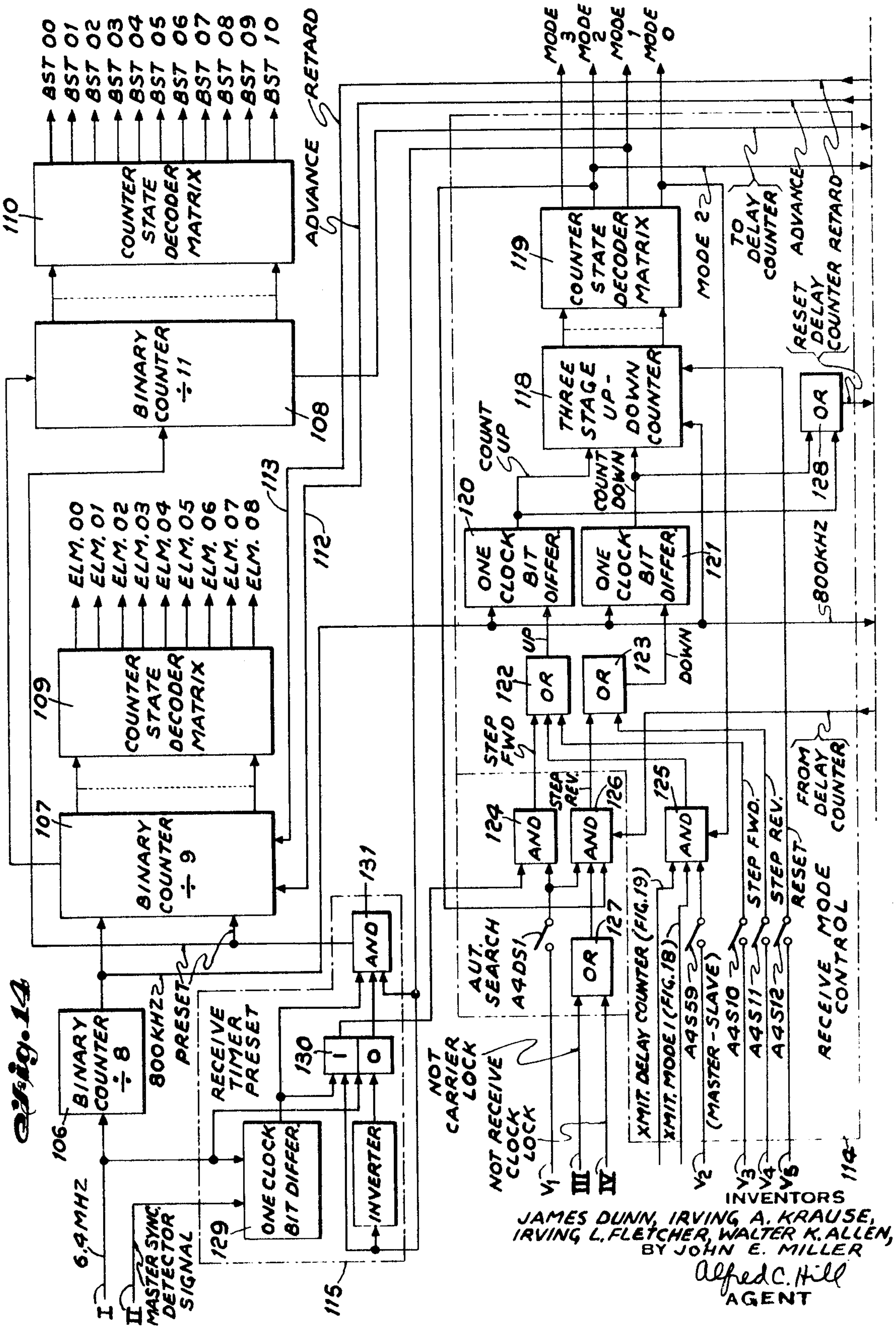
FIGS. 14 and 15, when arranged as illustrated in FIG. 13, is a block diagram of the receive timer and control equipment therefore in accordance with the principles of this invention.
Figure 15:
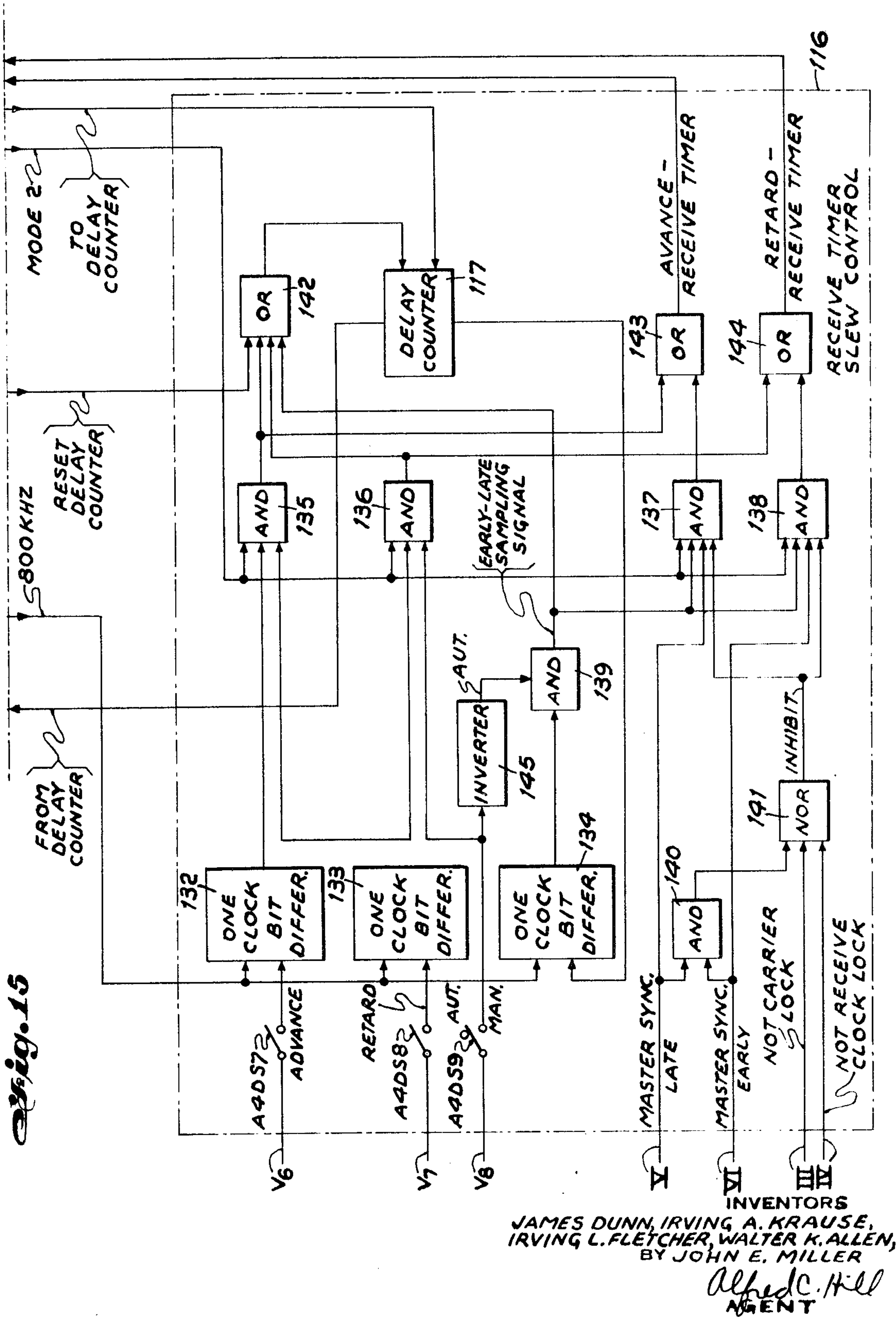

Referring to FIGS. 14 and 15, when arranged as illustrated in FIG. 13, there is illustrated a block diagram of receive timer 22 (FIG. 5). It should be noted that various input conductors to this block diagram are referenced by Roman numerals. These same Roman numerals are applied to the various outputs of locked loop 21, locked loop 20 and detector 23. This technique of applying reference symbols is being employed to illustrate the coupling relationship of the outputs of the above-mentioned circuits to the inputs of the block diagram of FIG. 14 and 15.

Figure 16:
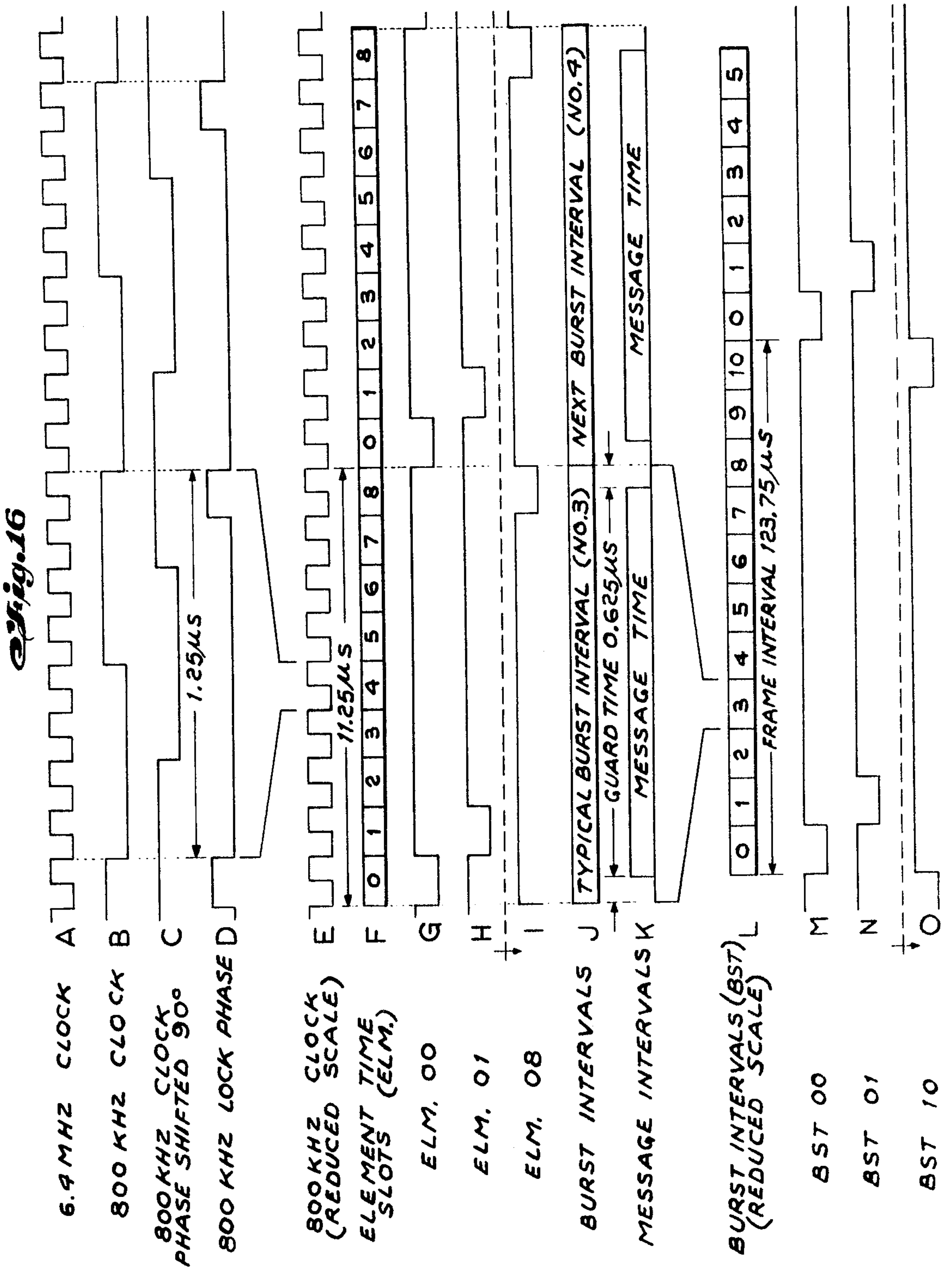
FIG. 16 is a timing diagram illustrating the timing signal present in both the receive and transmit timers of the station equipment illustrated in FIGS. 4, 5, 6, 7, 8 and 9.

The 6.4 MHz clock signal on conductor I is applied to divide-by-8 binary counter 106 with the output therefrom being coupled in cascade to divide-by-9 binary counter 107 and divide-by-11 binary counter 108. Counter 106 divides the 6.4 Mhz clock to give a 800 kHz. clock, or 1.25 microsecond intervals. Counter 107 counts out nine 1.25 microsecond steps to given the burst interval of 11.25 microseconds. Counter 108 counts out 11 intervals to give the frame interval of 123.75 microseconds. The counter states of counter 107 are decoded in matrix 109 to provide the element time slot signals ELM00 To ELM08. The counter states of counter 108 are decoded in matrix 110 to provide the burst interval timing signals BST00 to BST10. The various timing signals generated in this portion of the receive timer are illustrated in the timing diagram of FIG. 16.

There are three control lines 111, 112 and 113 that interrupt the normal time cycling of the counters. The control signal on conductor 111 presets the counters to the sync state and forms a part of the automatic receive search function described hereinbelow. The control signal on conductor 111 is only 0.150 microseconds wide and is placed away from the clocking edge to avoid counting ambiguity. The control signal on conductor 112 makes counter 107 count at double the clock rate thereby advancing the phase of the frame interval cycle. The control signal on conductor 113 inhibits counter 107 from counting and thereby retards the phase of the frame interval. The control signals on conductors 111, 112 and 113 are only enabled for 1.25 microseconds at a time and gated to be exclusive.

The control circuitry for the receive timer consists primarily of three logic functions, namely receive mode control unit 114, receive timer preset unit 115 and receive timer slew control unit 116. These units in conjunction with the outputs from locked loops 20 and 21 control the interruption of the cyclic action of the receive timer counters.

Mode control unit 114 is essentially an 8-state memory arrangement where each state signifies the states of the received synchronization process. At present, only the first four states are used in a they are as follows: (1) state 0 which indicates receive mode 0 providing a stop or inactive action; (2) state 1 indicating receive mode 1 during which the preset receive timer is operated; (3) state 2 indicating receive mode 2 to enable the early-late adjustment of the receive timer; and (4) state 3 indicating receive mode 3 wherein the sync process is completed.

Receive timer preset unit 115 consists of logic which detects the transition of mode status into receive mode 1 from any other receive mode and at the first detected sync pulse presets the receive time counters 107 and 108 via conductor 111.

The presetting of the receive timer counter is the first step in synchronizing the receive frame. Its function is to position the receive timer counter so that sync gates for the carrier tracking and receive clock phase locked loops are positioned to lock at a significant portion of the receive sync signal to afford the locking process. Associated with this process is the automatic receive search function. Since the master sync envelope detector 23 (FIG. 5) may respond to a noise burst resulting in an improperly preset receive timer counter, the receive search function was incorporated. This consists of presetting the receive timer counter and checking that the carrier tracking and receive clock phase locked loops 20 and 21 have locked in the end of 125 milliseconds. This 125 milliseconds interval is more than ample since the loop bandwidths are 100 Hertz or greater. If the loops are not locked at the end of this interval the receive timer counters are preset again by going to mode 2 than back to mode 1 and again waiting 125 milliseconds before examining to see if the loops have locked. If both locked loops have not locked, the process is repeated. However, when both loops lock, the receive synchronization is ready for early-late gating, resolving the ambiguity of the integral number of clock cycles and is put in mode 2 where the receive timer slew control unit 116 takes over. The process of receive search can be under manual or automatic control selected by the automatic receive search switch A4DS1. In the manual mode the operator watches the phase-locked loop indicator and switches the receive mode status register back and forth between mode 1 and mode 2. In automatic receive search, the preset signal causes the receive mode status register to advance to receive mode 2 than in an interval of 126 milliseconds is counted after which the carrier tracking and receive clock-locked signals are examined. If both are locked, the system remains in mode 2 and if not the receive mode status is retarded to mode 1 starting the cycle again.

In a master station, the receive status register will automatically go from receive mode 0 to receive mode 1 when in transmit mode 1. The transmit modes will be discussed hereinbelow.

The receive timer slew control unit 116 consists of a set of gates and a delay counter 117. It is enabled in receive mode 2 only. Its function is to generate the advance and retard signals for the receive timer counters. These signals are 1.25 microseconds wide, that is, one 800 kHz. clock interval, and are synchronized with counter 107 to avoid counting ambiguity. Receive timer slew control unit 116 may be under manual or automatic control selectable by a front panel control switch A4DS9. In manual, the advanced signal is generated by depressing the receive timer advance control switch A4DS7. The retard signal is generated by depressing the receive timer retard control switch A4DS8. The controls are actuated and released for each 1.25 microsecond slew. These controls are ineffective during automatic control and all other modes but the receive mode 2.

In an automatic control, the output of the early-late detector on conductors V and VI is sampled every 126 milliseconds and advance-retard signals are generated as follows: (1) generate advance at 126 milliseconds interval only if the carrier and the receive clock phase locked loops are locked and sync is not early but sync is late; and (2) generate retard at 126 milliseconds interval only if the carrier and receive clock phase locked loops are locked and sync is early but sync is not late. If these conditions are not met, no advance or retard signals are generated and delay counter 117 is reset to start counting a new delay interval.

Having discussed hereinabove the major functions of the major units of the receive timer 22, we will now turn to a more detailed description of the components and operation thereof.

Receive mode control unit 114 consists of a three stage up-down counter 118. The outputs of counter 118 are decoded by matrix 119. There are 4 inputs to the counter 118, namely, (1) reset signal as provided by switch A4S12 to force counter 118 to a 0 state; (2) the 800 kHz. clock for clocking the flip-flops of counter 118; (3) up count signal to enable counter 118 to count up; and (4) down count signal to enable counter 118 to count down.

The up and down count input signals are derived from one clock bit differentiators 120 and 121 which are triggered by the 800 kHz clock thereby stepping forward or backward only one state upon a command. OR gate 122 collects all step forward, up-count, commands which are: (1) AND gate 124 when in automatic receive search and sync pulse is detected; (2) AND gate 125 when station is master and receive is in mode 0; and the output of switch A4S10 when it is depressed for step-forward control. OR gate 123 collects all step reverse commands which are (1) AND gate 126 output when in mode 2, automatic receive search and 140 millisecond delay counter 117 interval has elapsed since presetting the receive timer counters and either the carrier or the receive clock phase locked loops are not locked as provided by the output of OR gate 127; and (2) the output of switch A4S11 when it is depressed for step-reverse control.

OR gate 128 is used to combine the up and down commands at the output of differentiators 120 and 121. The output of OR gate 128 is used to reset delay counter 117 which generates the sampling interval for automatic receive search.

Receive timer preset 115 consists of one clock bit differentiator 129, flip-flop 130 is forced to the reset state and AND gate 124 is disabled. When the receive mode is switched to mode 1, AND gate 124 is disabled as long as flip-flop 130 is reset. Upon detecting the leading edge of the sync output from differentiator 129, the receive timer preset signal is generated at the output of AND gate 131. Simultaneously flip-flop 130 is set. This enables AND gate 124 which permits advance to mode 2. This in turn causes flip-flop 130 to be reset which disables AND gate 131. AND gate 131, when disabled, prevents the differentiator outputs from generating any more receive timer preset signals.

The receive timer preset signal is 0.160 microseconds wide and is used to preset counters 107 and 108 directly, not clocked, to a state which takes into account the approximately 10 microsecond delay in the 800 kHz. filter in master sync envelope detector 23 (FIG. 5).

Receive timer slew control unit 116 includes delay counter 117, three one clock bit differentiators 132, 133 and 134 and a set of gates including AND gates 135, 136, 137, 138, 139 and 140; NOR gate 141; and OR gates 142, 143 and 144. Differentiators 132, 133 and 134 are used to generate 1.25 microsecond width signals phased with respect to counter 107 to avoid miscounts in that counter. Manual-automatic slew control is selected by switch A4DS9. In manual slew control, AND gates 135 and 136 are enabled. Action is initiated from the control panel. Depressing switch A4DS7 causes a 1.25 microsecond pulse to appear at the output of differentiator 132. This pulse enables AND gate 135 and through through OR gate 142 provides the advance command to delay counter 117.

Depressing switch A4DS8, the receive timer retard, causes a 1.25 microsecond pulse to appear at the output of differentiator 131 which enables AND gate 136. Through OR gate 144 the retard command is provided to the receive timer counter 107. Since these command signals are 1.25 microseconds wide, counter 107 will only change by one 800 kHz. clock interval for each control depression. Consequently, the control is depressed as many times as is required to affect the desired phase change in the receive timer counters.

In automatic control, AND gate 137 generates the advance command and AND gate 138 generates the retard command. Differentiator 134 generates a 1.25 microsecond width pulse at the end of the delay interval determined by counter 117. This pulse is then gated in AND gate 139 by the automatic enable signal from switch A4DS9 through inverter 145. The output of AND gate 139 serves as the sampling signal of the early-late detector in phase locked loop 21 (FIG. 5) whose signals appear on conductors V and VI. AND gate 137 and AND gate 138 are further gated by an inhibit signal produced in NOR gate 141 and the corresponding early-late signal on conductors V and VI. As mentioned, NOR gate 141 generates the inhibit signal which samples the conditions under which automatic slew action is inhibited from acting on the early-late signals. These are: (1) carrier phase locked loop 20 not locked signal on conductor III); (2) receive clock phase locked loop 21 not locked (signal on conductor IV); and (3) the master sync is both early and late as detected by AND gate 140. This last condition is provided as an interlock.

When an early-late sampling signal appears at the output of AND gate 139 and the inhibit output of NOR gate 141 is inactive, the following will occur; (1) sync is early, AND gate 138 is enables and will provide a retard command through OR gate 144 to counter 107 at the end of the delay interval; (2) sync is late, AND gate 137 is enabled and will provide an advanced command to counter 107 via OR gate 143 at the end of the delay interval; and (3) sync signal is neither early nor late, no slew command will be provided to the receive timer at the end of the delay interval.

Since the early-late sampling signal at the output of AND gate 139 only 1.25 microseconds wide, counter 107 will only be slewed one 800 kHz. clock interval at the end of each delay interval.

Counter 117 is a 10 stage counter used to generate the delay interval. It is connected to divide by 1024. This gives a delay interval of 123.75×1024 =126.27 milliseconds. At the end of executing each control counter 11' is reset by the output or OR gate 142 to ensure a full new delay interval.

The one clock bit differentia*ᵗⁱ* n circuits employed herein generate a pulse one clock bit wide when the applied signal changes from logic 0 to logic 1. The reverse arrangement may be implemented if desired.

Figure 19:
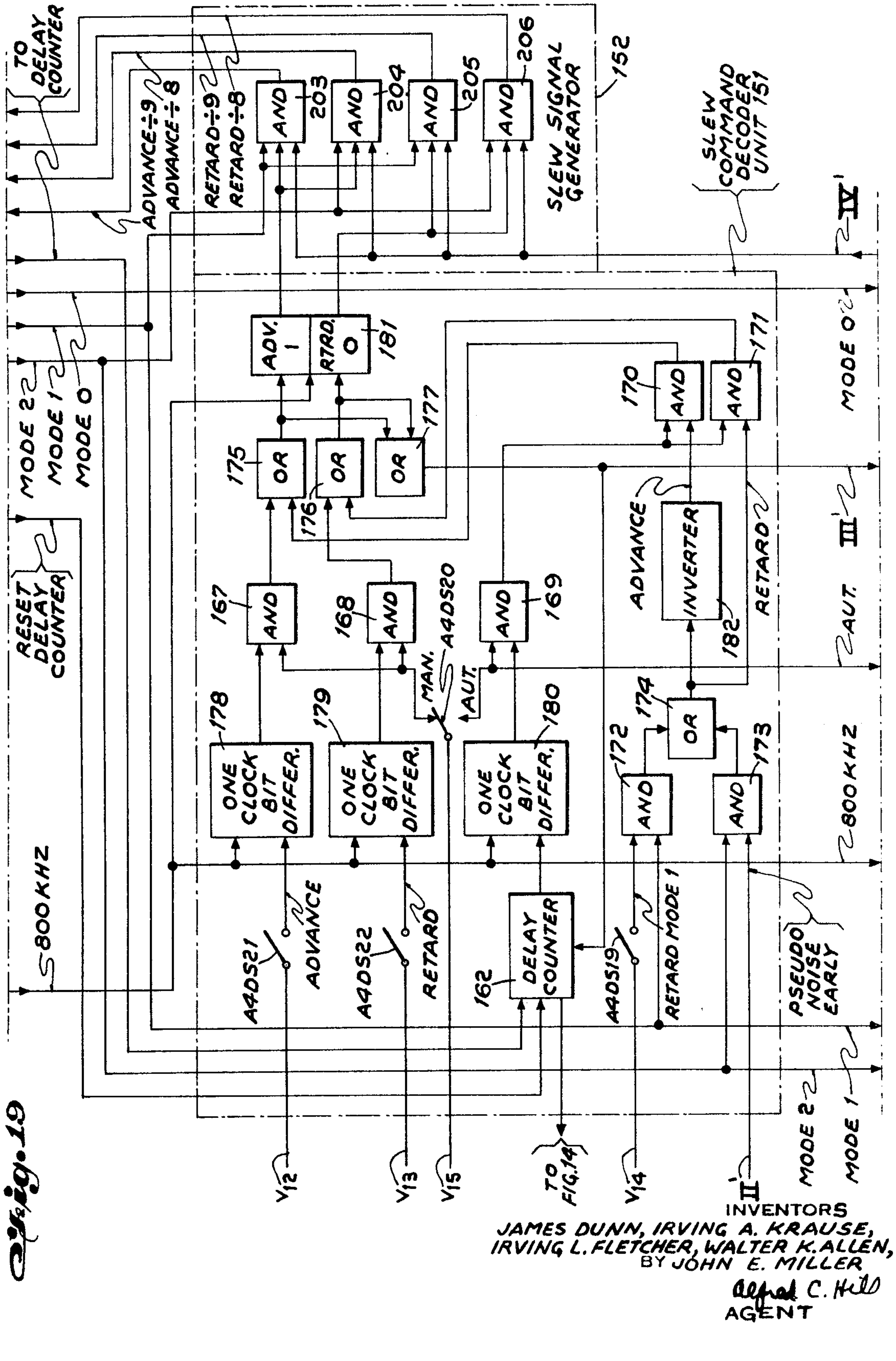
Figure 20:
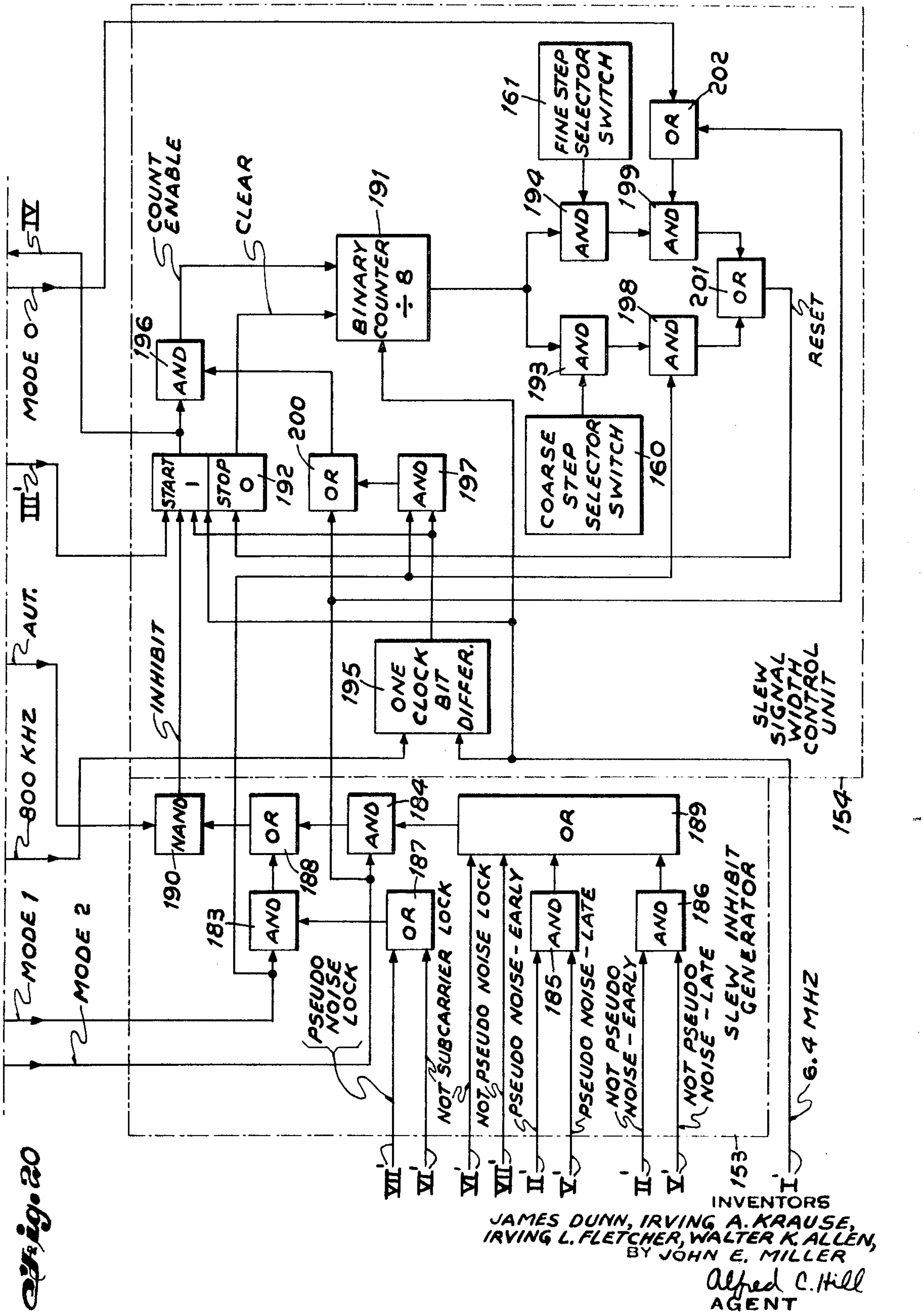

Referring to FIGS. 18, 19 and 20 when arranged according to FIG. 17, there is illustrated in block diagram of transmit timer 17 (FIG. 9). It should be noted that various input conductors of this block diagram are referenced by primed Roman numerals. These same primed Roman numerals are applied to the various outputs of locked loop 27 (FIG. 7) and locked loop 27 (FIG. 8). This technique of applying reference symbols is being employed to illustrate the coupling relationship of the outputs of these circuits to the inputs of the block diagram of FIGS. 18, 19 and 20.

Referring to FIG. 18, the transmit timer counter is constructed identically to that employed in the receive timer. It consists of three counters divide-by-8 binary counter 146, divide-by-9 binary counter 147, and divide-by-11 binary counter 148 connected in cascade to the 6.4 MHz clock on conductor I' provided at the output of phase shifter 29 (FIG. 6). These counters are arranged to clock out the transmit frame. Counter 146 divides the 6.4 MHz to 800 kHz. or 1.25 microsecond interval. Counter 147 counts out nine 1.25 microsecond intervals to give the burst interval of 11.25 microseconds. Counter 148 counts out 11 bursts to give the frame interval of 123.75 microseconds. Counters 147 and 148 are clocked simultaneously from the output of counter 146, thus giving time integrity for the different burst intervals.

The counter states of counter 147 are decoded by matrix 149 to provide the element time slots ELM00 to ELM08. The binary states of counter 147 are decoded by matrix 150 to provide the burst interval timing signals BST00 to BST10. The timing signals in the outputs of matrixes 149 and 150 are available for other system functions for transmit time interval gating. The transmit timer counters for four control times, two for fine slewing and two for coarse slewing of the transmit frame cycle phase. These are generated in the transmit timer slew control unit including decoder slew command unit 151 slew signal generator 152, slew inhibit generator 153 and slew signal width control unit 154.

The fine slew control signals present on conductors 155 and 156 are applied to counter 146 thereby implementing a slew resolution of 1/6.4 microseconds, or 157 nanoseconds. The signal on conductor 155 makes counter 156 count at double the normal rate thereby advancing the transmit frame cycle a phase equal to the time the signal on this conductor is active. The signal on conductor 156 inhibits counter 146 from counting thereby retarding the phase of the transmit frame cycle a phase equal to the time this signal is active.

The coarse slew control signals are present on conductor 157 and 158 and are applied to counter 147 thereby implementing a slew resolution of 1.25 microseconds. Unlike the receive timer slew signal, respective transmit slew signals may be up to 10 microseconds wide selectable by a panel control. The control signal on conductor 157 makes counter 147 count at double the rate thereby introducing a transmit frame cycle phase advance equal to the time this slew signal is active. The control signal on conductor 158 stops counter 157 from counting thereby introducing a transmit frame cycle phase retard equal to the time this slew signal is active.

The control circuitry for the counters consists of two main logic units, namely, transmit mode control unit 159 and the transmit timer slew control unit which includes decoder slew command unit 151, slew signal generator 152, slew inhibit generator 153 and slew signal width control unit 154. These units respond to the output of pseudo noise-ranging phase-locked loop 24 and subcarrier tracking phase-locked loop 27 to control the interruption in the cyclic action of the transmit timer counters.

Transmit mode control unit 159 is similar to the receive mode control unit. It consists of an eight state memory where each state signifies the status to the transmit synchronization process. At present, only the first four states are used and these are assigned as follows. For a master terminal, state 0 corresponds to transmit mode 0 which provides the action of automatic carrier control and automatic sync modulator control, transmit carrier CW and transmit 800 kHz. CW. State 1 corresponds to transmit mode 1 which permits automatic carrier control and automatic sync modulator control, transmit carrier pulsed and 800 kHz. pulsed. States 2 and 3 correspond to transmit modes 2 and 3 which are not used in the master station. For a slave terminal, state 0 represents transmit mode 0 and is inactive and is utilized as the reset state. State 1 corresponds to transmit mode 1 which enables coarse slew step function. State 2 corresponds to transmit mode 2 which enables fine slew step function. State 3 corresponds to transmit mode 3. In this state the servo drive is enabled and also the fill burst transmission is enabled. This is the normal operating mode of the slave station.

The transmit timer slew control provide coarse slew signals in transmit mode 1 and fine slew signals in transmit mode 2. In transmit mode 1, the slew signal may be 1.25 to 10 microseconds selectable in 1.25 microseconds steps at the front panel by the coarse slew step selector switch 160 (FIG. 20). In transmit mode 2, the slew signal may be 1.25/8 microseconds to 1.25 microseconds selectable in steps of 1.25/8 microseconds at the front panel by fine step selector switch 161 (FIG. 20). The transmit timer slew control unit may be under manual or automatic control by appropriate operation of switch A4DS20 (FIG. 19).

In manual control, the advance signal is generated by depressing switch A4DS21 (FIG. 19). In transmit mode 1, the advance signal will be 1.25 times *n* microseconds wide, there *n* is the setting of the coarse step selector switch 160. In transmit mode 2, the advance signal will be 1.25/8 times *n* microseconds wide, where *n* is the setting of the fine step switch 161.

In manual control, the retard signal is generated by depressing switch A4DS21 (FIG. 19). In transmit mode 1, the retard signal will be 1.25 times *n* microseconds wide, where *n* signifies the setting of coarse step selector switch 160. In transmit mode 2, the retard signal will be 1.25/8 times *n* microseconds wide, where *n* signifies the setting of the fine step selector switch 161.

In manual control, the retard signal is generated by depressing switch A4DS22. In transmit mode 1, the retard signal will be 1.25 times *n* microseconds wide, where *n* signifies the setting of coarse step selector switch 160. In transmit mode 2, the retard signal will be 1.25/8 times *n* microseconds wide, where *n* signifies the setting of the fine step selector switch 161.

In automatic control and transmit mode 1, the transmit mode 1 retard switch A4DS19 is sampled every 126 milliseconds and advance or retard signals are generated as follows: (1) generate advance at the 126 millisecond interval point only if the subcarrier locked loop is locked, the pseudo noise locked loop is not locked and switch A4DS19 is in advance; and (2) generate retard at the 126 millisecond interval point only if the subcarrier phase-locked loop is locked, the pseudo noise phase-locked loop is not locked and switch A4DS19 is in retard. The width of the slew signals is governed by the setting of the coarse step selector switch 160 and the values are the same as that for manual slew operation.

In automatic operation and transmit mode 2, the output of the early -late detector in the pseudo noise ranging phase locked loop 24 (FIG. 8) is sampled every 126 milliseconds and advance or retard signals are generated as follows: (1) generate advance at the 126 millisecond interval point only if the subcarrier and pseudo noise phase-locked loops are locked and the pseudo noise signal is late but not early; and (2) generate retard at the 126 millisecond interval point only if the subcarrier and pseudo noise phase-locked loops are locked and the pseudo noise signal is early but not late. The width of the slew signal is governed by the setting of the fine step select switch 161 and the values are the same as that for transmit mode 2, manual slew operation.

If the above conditions for automatic slew control operation are not met, no slew action is taken. However, the delay counter 162 (FIG. 19) is reset to start counting a new delay interval.

Transmit mode control unit 159 includes a three stage up-down counter 163 whose first four states are decoded by matrix 164. There are four inputs to counter 163 which control the setting of the transmit mode state, namely, (1) set to mode 0 control, switch A4DS 25; (2) 800 kHz. clock for clocking the flip-flops of counter 163; (3) up-count, enable up-count switch A4DS 23; (4) down-count, enable down count switch A4DS24.

The up and down count enable inputs for counter 163 are derived from one clock bit differentiators 165 and 166. These differentiators are triggered from the 800 kHz. clock. This results in only one counter state charge per command signal. Counter 163 advances to the next higher state for each depression of switch A4DS 23. For each depression of the step reverse control switch A4DS 24, counter 163 will go one state backward. In both cases the corresponding one clock bit differentiator takes the switch signal and makes it a pulse one clock wide thereby enabling counter 163 for only one clock period. This results in only one counter stage charge per each switch depression. Switch A4DS25 is used to force counter 163 to transmit mode 0 state.

Turning now to the transmit slew control, slew command decoder unit 151 consists of a set of gates including AND gates 167, 168, 169, 170, 171, 172 and 173; OR gates 174, 175, 176 and 177; delay counter 162; one clock bit differentiators 178, 179 and 180; and flip-flop 181 which stores the indicated phase change direction.

Differentiator 178 senses the depression of switch A4DS21, the manual transmit timer advance control. For every depression of switch a 1.25 microsecond pulse appears at the output of differentiator 178. This pulse is then gated by AND gate 167 and sets flip-flop 181 into the advance position through OR gate 175. AND gate 167 is only enabled in manual slew control as selected by switch A4DS20. Differentiator 179 senses the depression of switch A4DS 22, the manual transmit timer retard control. For every depression of this switch, a 1.25 microsecond pulse appears at the output of differentiator 179. This output is then gated by AND gate 168 and sets flip-flop 181 in the retard state through OR gate 176. Like AND gate 167, AND gate 168 is only enabled in manual slew control. Since AND gates 167 and 168 are only enabled in manual slew control, the manual advance and manual retard are inoperative during automatic slew control.

Differentiator 180 senses when delay counter 162 has reached full count, namely, 126 milliseconds, and generates a 1.25 microsecond pulse every time counter 162 reaches full count. This 1.25 microsecond pulse is then gated by AND gate 169 and is used to enable AND gates 170 and 171. AND gate 169 is enabled only during automatic slew control as selected by switch A4DS20. The inputs to AND gates 170 and 171 are mutually exclusive since the advance is derived by inverting the retard signal in inverter 182. Consequently, for automatic operation, only the retard signal is decoded. The retard signal is derived as follows.

During transmit mode 1, AND gate 172 is enabled and if the mode 1 retard switch A4DS 19 is in retard position an output appears at AND gate 172 which then enables AND gate 171 through OR gate 174. The output of AND gate 171 then sets flip-flop 181 to the retard position through OR gate 176 whenever there is an enable signal from AND gate 169. When switch A4DS19 is not in the retard position, AND gate 170 is enabled by inverter 182. The output of AND gate 170 when sets flip-flop 181 to the advance position through OR gate 175 whenever there is an enabling signal from AND gate 169.

In transmit mode 2, AND gate 172 is disabled and AND gate 173 is enabled thereby sampling the pseudo noise early signal on conductor II′ in the same manner as switch A4DS19 was sampled in transmit mode 1.

The outputs of OR gates 175 and 176 are applied to the input of OR gate 177 which produces an output used to reset delay counter 162 and to activate the slew signal width control unit 154.

Delay counter 162 is a 10 stage counter used to generate the delay interval and is connected to divide by 1024. This gives a delay interval of 123.75 ×1024 =126.7 milliseconds. Counter 162 will normally recycle by itself. However, it is reset whenever the transmit mode changes state and at the end of each decoded slew command to ensure a proper start of the delay timer to count out the delay interval.

Slew inhibit generator 153 consists of AND gates 183, 184, 185 and 186 OR gated 187, 188 and 189; and NAND gate 190 at whose output occurs the inhibit signal. OR gate 187 detects whether there is a pseudo noise signal lock or when there is not a subcarrier lock. The output of OR gate 187 enables AND gate 183 when in transmit mode 1 to provide an output to OR gate 188 to enable NAND gate 190 to produce the inhibit signal when in automatic operation as selected by switch A4DS20 (FIG. 19).

When in transmit mode 2, AND gate 184 is enabled. An output will be produced from AND gate 184 for coupling to OR gate 188 when AND gate 185 detects that the pseudo noise signal is both early and late providing an output to OR gate 189. AND gate 186 provides an output to OR gate 189 when pseudo noise signal is not early and is not late. OR gate 189 also has inputs indicative of when subcarrier lock is not present or when the pseudo noise signal lock is not present. The logical conditions present on the various gates and remembering that a lock condition is represented by 0 volts and a lock condition id represented by +3 volts, the operation of generator unit 153 is fairly obvious to those skilled in the art and will not be further discussed.

Slew signal width control unit 154 includes a divide-by-8 binary counter 191, start-stop flip-flop 192; two coincidence or AND gates 193 and 194; coarse step selector switch 160; fine step selector switch 161; one clock bit differentiator 195; and a group of gates including AND gates 196, 197, 198 and 199 and OR gates 200, 201 and 202. Flip-flop 192 is set by the output of OR gate 177 (FIG. 19) in the absence of an inhibit signal from NAND gate 190 and reset by an output from OR gate 201. The width of the slew signal is determined by how long flip-flop 192 is in the set position. Effectively a reset signal for flip-flop 192 is generated when counter 191 reaches a state corresponding to the step selector switch setting. Two step selector switches 160 and 161 are incorporated, switch 160 for mode 1 and switch 161 or mode 2. Coincidence or AND gate 193 compares the output of counter 191 with the setting of switch 160. Coincidence or AND gate 194 compares the counter state of counter 191 to the setting of switch 161. In mode 1, AND gate 198 is enabled and whenever the counter state corresponds to the setting of switch 160, AND gate 193 generates a signal which resets flip-flop 192 through OR gate 201.

In transmit mode 2, or transmit mode 0 AND gate 199 is enabled and whenever the counter state corresponds to the setting of switch 161, AND gate 194 generates a signal which also resets flip-flop 192 through OR gate 201. OR gate 202 responding to transmit mode 0 or 2 and provides the enabling signal for AND gate 199. The transmit mode 0 condition was included to avoid system lockup after power turn-on. Counter 191 is made to count the 800 kHz. in transmit mode 1 and to count the 6.4 Mhz in transmit mode 2. This is implemented as follows. Counter 191 is enabled by AND gate 196 which is controlled by two signals, the output of flip-flop 192 and the output of OR gate 200. In mode 2, the output of OR gate 200 is always active so counter 191 is enabled every time flip-flop 192 is in the set condition. Therefore, counter 191 will count the 6.4 MHz for as long as flip-flop 192 is in the set state. In mode 1, OR gate 200 is activated by the output of AND gate 197. AND gate 197 is enabled by transmit mode 1 which is always present in transmit mode 1 and the output of differentiator 195. The output of differentiator 195 will be one 1/6.4 microsecond wide pulses every 1.25 microseconds, that is, it differentiates the 800 kHz. clock. Therefore, counter 191 will be enabled at 800 kHz. for as long as flip-flop 192 is in the set state. The output of differentiator 195 is also used to set flip-flop 192 to ensure a proper starting point for counting out the slew signal width and to ensure the proper phase relationship between the transmit timer clock and the slew signal, it is forced to the 0 state whenever flip-flop 192 is reset.

The actual slew signal to counters 146 and 147 (FIG. 18) appears at the output of four AND gates 203, 204, 205 and 206 which are the components in slew signal generator 152. Each of these gates are enabled by three signals, namely, the transmit mode, the outputs of flip-flop 181 and the start output of flip-flop 192. AND gates 203 and 205 are enabled in mode 1. AND gates 204 and 206 are enabled in mode 2. AND gates 203 and 204 are enabled by the advance output of flip-flop 181 while AND gates 205 and 206 are enabled by the retard output of flip-flop 181. All four of these gates require the start output of flip-flop 192. Summarizing the condition: (1) in mode 1, the output of AND gate 203 is the advances signal to counter 147 and the output of AND gate 205 is retard signal to counter 147; and (2) in mode 2, the output of AND gate 204 is the advance signal to counter 146 and the output of AND gate 206 is the retard signal to counter 146.

The width of the slew signal is equal to the time flip-flop 192 remains in the start condition. In mode 1, this is determined by the setting of switch 160. In mode 2, it is determined by the setting of switch 161. In mode 1, the switch setting results in s slew pulse width 8 times larger than that which results for the same switch setting in mode 2, since counter 191 is counting at 800 kHz. in mode 1 and is counting at 6.4 MHz. in mode 2. A slew signal is generated whenever flip-flop 192 is set, that is, whenever a slew command is detected and there is no inhibit condition. A slew command may be initiated manually, or automatically as detected by the logic in the slew command decoder unit 151.

While we have described above the principles of our invention in connection with specific apparatus, it is to be clearly understood that this description is made only by way of example and not as a limitation to the scope of our invention as set forth in the objects thereof and in the accompanying claims.

We claim:

1. A synchronization system to control signals transmitted from each of a master station and a plurality of slave stations to be propagated through a common repeater in a different one of a plurality of time slots of time division multiplex format as said repeater, said stations and said repeater having relative motion therebetween, comprising:
   first means disposed in said master station to transmit a sync burst through said repeater in one of said time slots;
   second means disposed in each of said slave stations responsive to said sync burst from said repeater to control the production of timing signals employed to control the time of transmission of said transmitted signals from the associated one of said slave stations;
   third means disposed in each of said slave stations to transmit a ranging signal through said repeater in its associated one of said time slots; means disposed in each of the slave stations for receiving the ranging signal transmitted by the associated slave station through the repeater; and
   means, including digital and analog signal processing means, disposed in each of said slave stations coupled to said second means responsive to said ranging signal received from said repeater to adjust the time position of said timing signals so that the time of transmission of said transmitted signals from the associated one of said slave stations is such that said transmitted signals occurs in the proper one of said time slots at said repeater.

2. A system according to claim 1, further including a source of said ranging signal in each of said slave stations, said ranging signal source including
   a lower power level psuedo noise code signal.

3. A system according to claim 1, wherein
   said first means includes
   fourth means to adjust the carrier frequency of said sync burst to
   compensate for the doppler effect in the transmission path from said master station to said repeater to provide said sync burst received at said repeater with the desired carrier frequency.

4. A system according to claim 3, wherein
   said fourth means includes
   fifth means to receive said sync burst from said repeater, and
   sixth means coupled to said fifth means to maintain the sum of the carrier frequencies said received and transmitted sync burst constant.

5. A system according to claim 4, wherein
   said sixth means includes
   a first source of reference frequency signal,
   a second source of offset frequency signal,
   a voltage-controlled oscillator;
   mixer means coupled to said fifth means, said oscillator and said second source, and
   a phase detector coupled to said first source, said mixer means and said oscillator compensating the output signal of said oscillator for said doppler effect.

6. A system according to claim 1, wherein
   said second means includes
   a voltage-controlled oscillator,
   a phase shifter responsive to said oscillator, and
   binary counter means responsive to said phase shifter to produce said timing signals; and
   said signal-processing digital and analog means includes
   fourth means to receive said ranging signal from said repeater,
   a source of reference ranging signal,
   fifth means responsive to said source of reference ranging signal and said fourth means to produce at least first and second control signals,
   sixth means to couple one of said control signals to said counter means to digitally control the count thereof, and
   seventh means to couple the other of said control signals to said phase shifter to phase shift in analog manner the output signal of said oscillator.

7. A system according to claim 1, wherein
   said second means includes
   fourth means to adjust the carrier frequency of said transmitted signals to compensate for the doppler effect in the transmission path from the associated one of said slave stations to said repeater to provide said transmitted signal received at said repeater with the desired carrier frequency.

8. A system according to claim 7, wherein
   said fourth means includes
   fifth means to receive said sync burst from said repeater, and
   sixth means coupled to said fifth means to maintain the sum of the carrier frequencies of said received sync burst and said transmitted signal constant.

9. A system according to claim 8, wherein
   said sixth means includes
   a first source of reference frequency signal, a second source of offset frequency signal,
a voltage-controlled oscillator,
mixer means responsive to said fifth means, said oscillator and said second source, and
a phase detector coupled to said first source, said mixer means and said oscillator to compensate the output signal of said oscillator for said doppler effect.

10. A system according to claim 9, wherein
said second means further includes a phase shifter responsive to said oscillator, and binary counter means responsive to said phase shifter to produce said timing signals; and
said digital and analog signal-processing means includes seventh means to receive said ranging signal
from said repeater, a source of reference ranging signal, eighth means responsive to said source of reference ranging
signal and said seventh means to produce at least first and second control signals, ninth means to couple one of said control signals to said
counter means to digitally control the count thereof, and tenth means to couple the other of said control signals to
said phase shifter to phase shift in an analog manner the output signal of said oscillator.

11. The synchronization system of claim 1 wherein the time position adjusting means includes: counter means, a variable phase source of oscillations driving the counter means, means for slew adjusting the count of the counter means in response to the ranging signal and independently of the oscillations, and means for controlling the phase of the oscillations in response to the ranging signal, the slew adjustment of the counter means and the phase adjustment of the oscillations respectively being relatively coarse and fine controls for the time of transmissions of the transmitted signals.

12. The system of claim 11 wherein the slew-adjusting means includes: first means for adjusting the count of the counter means by a first predetermined number of steps in response to a first condition of the range signal received at the slave station, and second means for adjusting the count of the counter means by a second predetermined number of steps in response to a second condition of the received signal at the slave station.

13. A system according to claim 12 further including a source of said ranging signal in each of said slave stations, said ranging signal source including pseudo noise code signal, means for detecting the pseudo noise code signal in the ranging signal received a t the slave station, means for comparing the transmitted and detected pseudo noise code signals for deriving first and second signals respectively indicative of lock between the detected and transmitted pseudo noise signal and the relative time positions of the detected and transmitted pseudo noise signal, and means for controlling said first and second means in response to the first and second signals respectively.

14. A synchronization system to control signals transmitted from each of a master station and a plurality of slave stations to be propagated through a common repeater in a different one of a plurality of time slots of a time division multiplex format at said repeater, said stations and said repeater having relative motion therebetween comprising:
first means disposed in said master station to transmit a sync burst through said repeater in one of said time slots:
second means disposed in each of said slave stations responsive to said sync burst from said repeater to control the production of timing signals employed to control the time of transmission of said transmitted signals from the associated one of said slave stations;
third means disposed in each of said slave stations to transmit a ranging signal through said repeater in its associated one of said time slots; means disposed in each of the slave stations for receiving the ranging signal transmitted by the associated slave station through the repeater; and means disposed in each of said slave stations coupled to said second means responsive to said ranging signal received from said repeater to adjust the time position of said timing signals so that the time of transmission of said transmitted signals from the associated one of said slave stations is such that said transmitted signal occurs in the proper one of said time slots at said repeater and said time position-adjusting means including: counter means, a variable phase source of oscillations driving the counter means, means in response to the ranging signal and independently of the oscillations, and means for controlling the phase of the oscillations in response to the ranging signal, the slew-adjustment of the counter means and the phase adjustment of the oscillations respectively being relatively coarse and fine controls for time of transmission of the transmitted signals.